United States Patent [19]

Emori et al.

[11] Patent Number: 5,084,717
[45] Date of Patent: Jan. 28, 1992

[54] IMAGE RECORDING SYSTEM

[75] Inventors: Kiyoshi Emori; Hiroshi Maekawa; Toshihiko Kumon, all or Osaka, Japan

[73] Assignee: Minolta Camera Kabushiki Kaisha, Osaka, Japan

[21] Appl. No.: 607,762

[22] Filed: Oct. 30, 1990

Related U.S. Application Data

[63] Continuation of Ser. No. 403,981, Sep. 5, 1989, abandoned, which is a continuation of Ser. No. 242,419, Sep. 9, 1988, abandoned.

[30] Foreign Application Priority Data

Sep. 11, 1987 [JP] Japan .................. 62-228970
Dec. 17, 1987 [JP] Japan .................. 62-319689

[51] Int. Cl.$^5$ .................. G01D 15/06
[52] U.S. Cl. .................. 346/157
[58] Field of Search .................. 346/157

[56] References Cited

U.S. PATENT DOCUMENTS

| | | | |
|---|---|---|---|
| 3,914,043 | 10/1975 | McVeigh | 346/157 |
| 3,960,445 | 6/1976 | Drawe | 346/157 |
| 4,467,334 | 8/1984 | Anzai | 346/160 |
| 4,555,763 | 11/1985 | Dahme | 346/157 |
| 4,568,169 | 2/1986 | Wada et al. | 346/157 |
| 4,579,443 | 4/1986 | Abuyama et al. | 346/157 |
| 4,707,713 | 11/1987 | Ayata et al. | 346/140 R |
| 4,707,714 | 11/1987 | Ayata et al. | 346/140 R |
| 4,720,730 | 1/1988 | Ito | 346/157 |
| 4,733,270 | 3/1988 | Mishikau et al. | 346/157 |
| 4,814,787 | 3/1989 | Haneda et al. | 346/157 |
| 4,847,654 | 7/1989 | Honma et al. | 346/157 X |

FOREIGN PATENT DOCUMENTS 61-203474 9/1986 Japan .................. 346/157

Primary Examiner—Donald Griffin
Attorney, Agent, or Firm—Burns, Doane, Swecker & Mathis

[57] ABSTRACT

An image recording system including a host control unit for supplying image data representative of the images to be printed on a record medium and a printer apparatus for forming printed images on the record medium on the basis of the data received from the host control unit, wherein the printer apparatus comprises an image transfer drum having a photoconductive surface, two or more image developing units responsive to the image data for forming a page of electrostatic latent images on the photoconductive surface, change-over means operative to selectively activate any of the image developing unit into operation, electrostatic chargers and charge erasers for transferring the page of electrostatic latent images on the photoconductive surface to the record medium, characterized in that the host control unit is operative to further supply control data predominant over the modes and conditions in which the images are to be printed on the record medium, the control data containing color data specifying a color or colors in which printed images are to be formed on the record medium and in that, when one of the image developing unit is in operation forming a page of electrostatic latent images on the photoconductive surface, the change-over means activates another image developing unit into operation and de-activates the former.

12 Claims, 16 Drawing Sheets

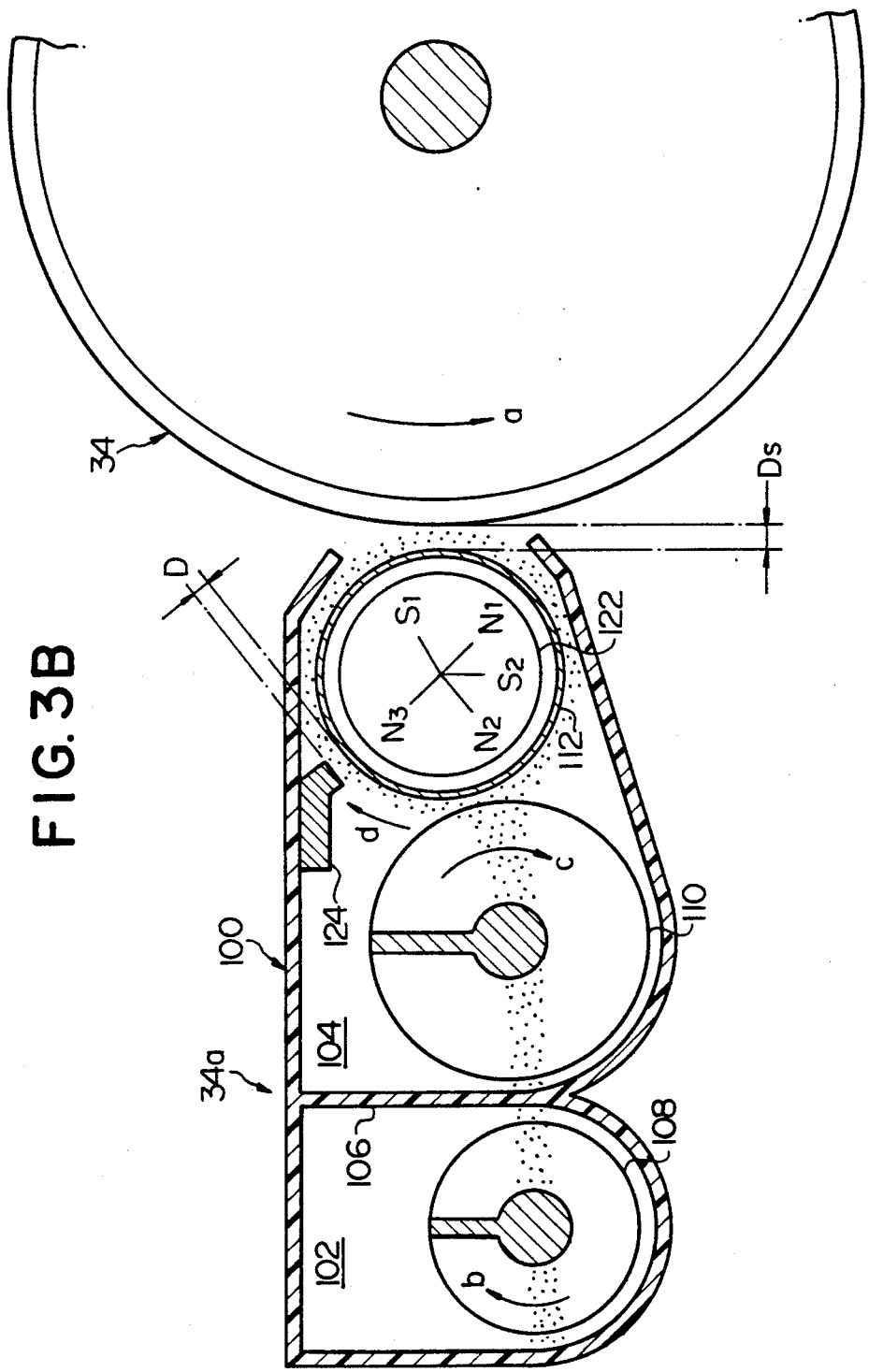

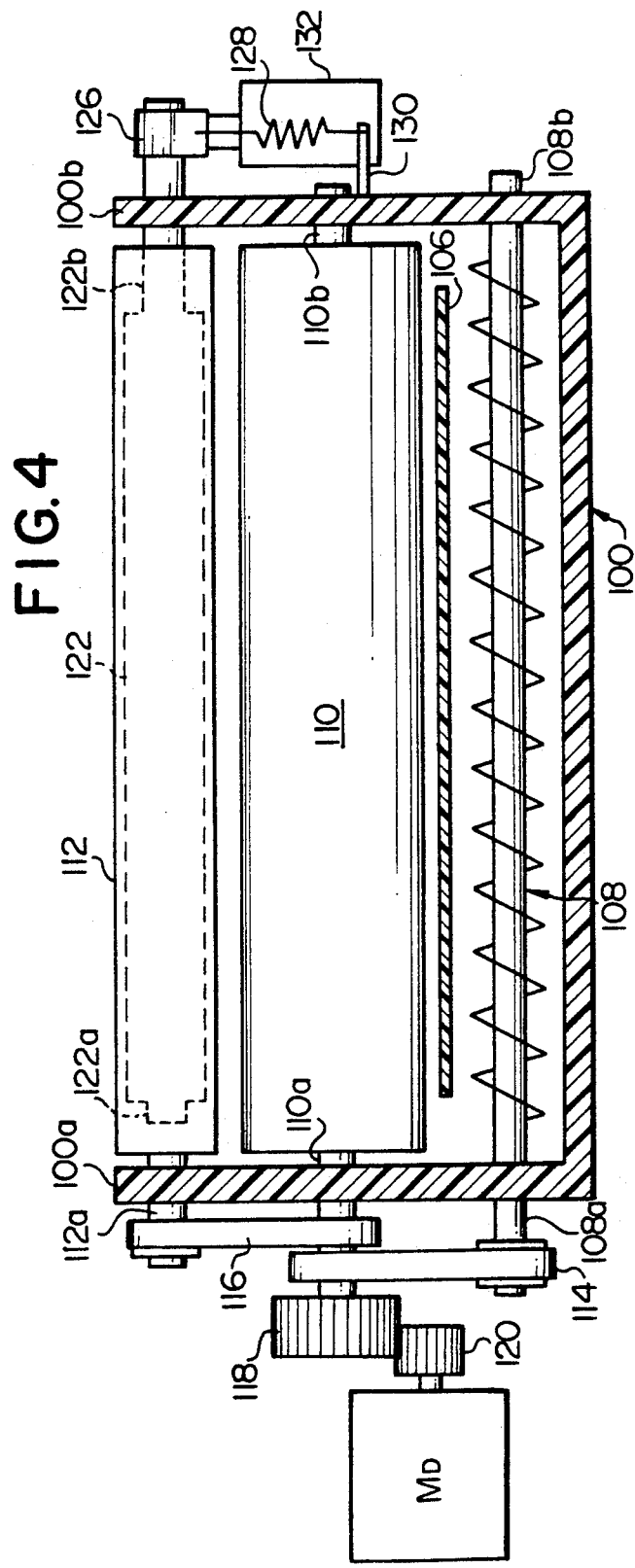

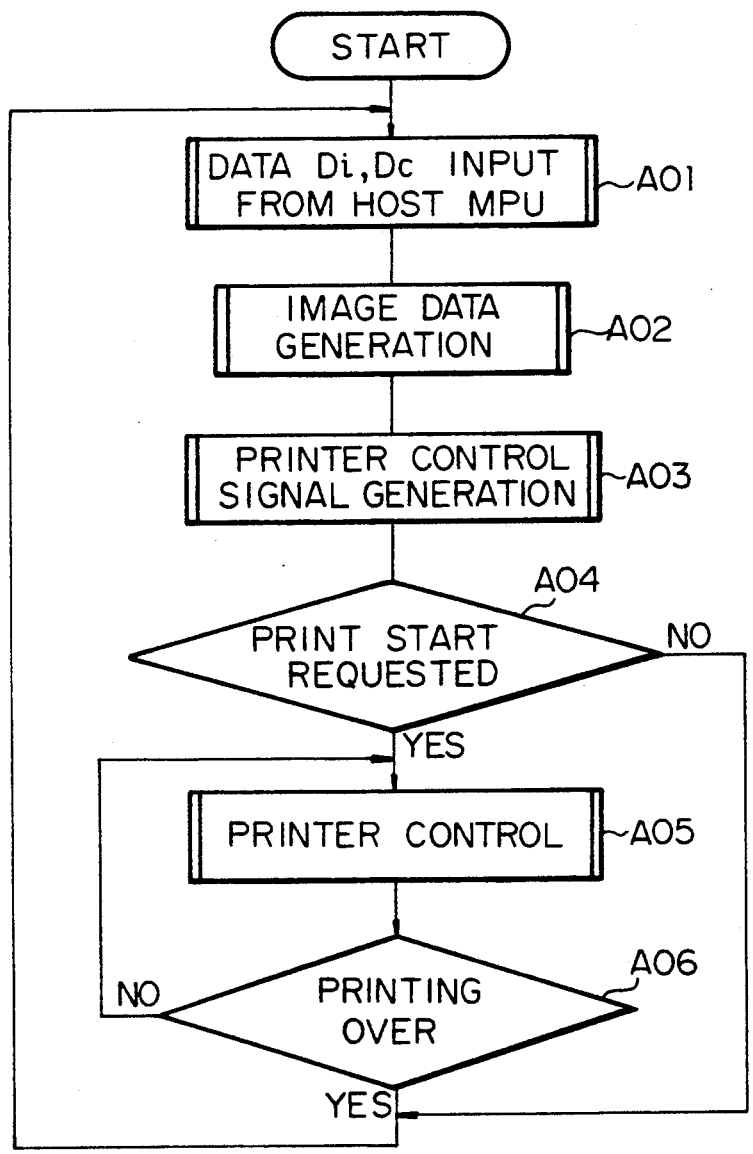

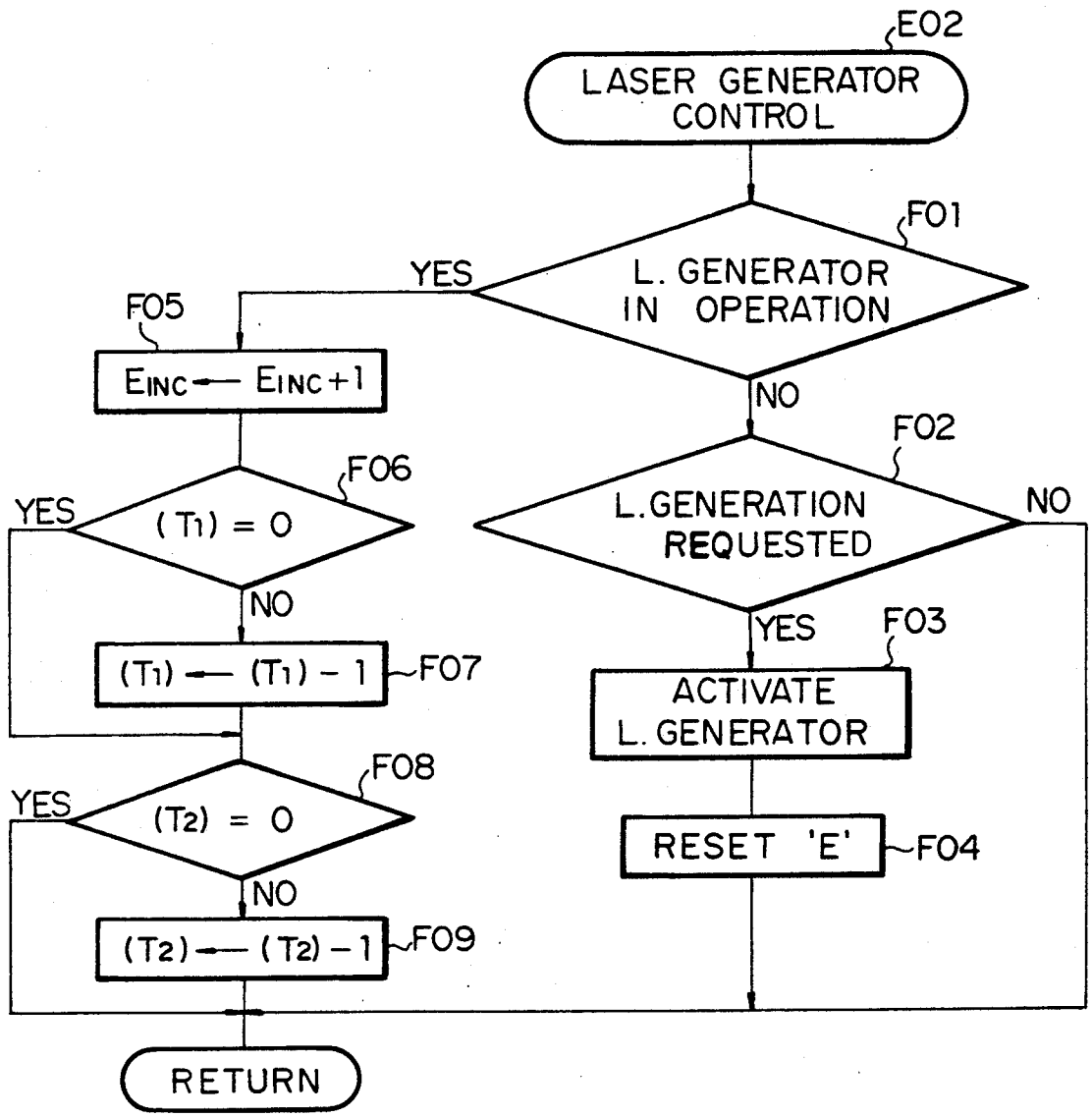

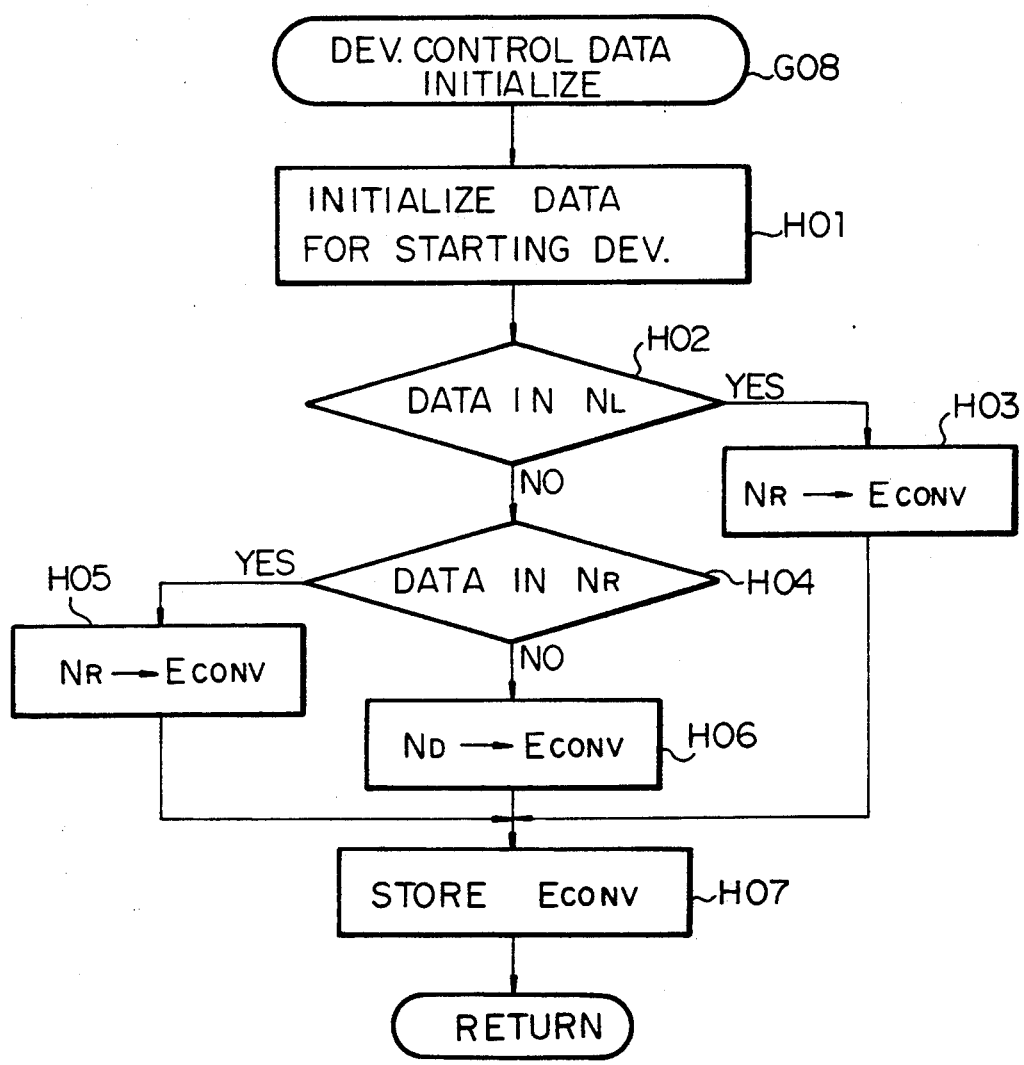

IMAGE RECORDING SYSTEM

This application is a continuation of application Ser. No. 07/403,981 filed Sept. 5, 1989 and now abandoned, which is a continuation of application Ser. No. 07/242,419 filed Sept. 9, 1988 and now abandoned.

FIELD OF THE INVENTION

The present invention relates to an image recording system including a printer apparatus and particularly to an image recording system comprising the combination of a printer apparatus and a host control unit implemented by, for example, a personal computer or a microprocessor incorporated in a word processor.

BACKGROUND OF THE INVENTION

An electrophotographic printer coupled with a host system such as a microprocessor built-in word processor or a business-purpose personal computer ordinarily prints images only in a single color. In the meantime, there is presently a growing trend toward the use of multicolor displays in word processors and personal computers and, to be consonant with such a trend, it is desired that printed outputs be also produced in a plurality of colors in printers of the electrophotographic type.

A prime object of the present invention is to provide an image recording system including an improved electrophotographic printer apparatus capable of producing multicolor printed outputs.

SUMMARY OF THE INVENTION

The present invention contemplates provision of an image recording system responsive to control data formulated in terms of different criteria and thus capable of selecting any of the different criteria in selectively activating any of the developing units available in the printer apparatus forming part of the image recording system.

In accordance with one outstanding aspect of the present invention, there is provided an image recording system comprising a host control unit for supplying image data representative of the images to be printed on a record medium and a printer apparatus for forming printed images on the record medium on the basis of the data received from the host control unit, wherein (A) the host control unit is operative to further supply control data predominant over the modes and conditions in which the images are to be printed on the record medium, the control data containing color data specifying a color or colors in which printed images are to be formed on the record medium, and (B) the printer apparatus comprises (a) means having a photoconductive surface, (b) a plurality of latent image forming means responsive to the image data for forming a page of electrostatic latent images on the photoconductive surface, (c) image transfer means for transferring the page of electrostatic latent images on the photoconductive surface to the record medium, and (d) change-over means which, when one of the latent image forming means is in operation forming a page of electrostatic latent images on the photoconductive surface, activates another latent image forming means into operation and de-activates the former.

In accordance with another outstanding aspect of the present invention, there is provided an image recording system comprising a printer apparatus, external data processing means and internal data processing means operatively coupled to the external data processing means by hardware means through which data is to be exchanged between the internal data processing means and the external data processing means, (a) the printer apparatus having a first mode of operation in which visible images are to be formed in a single color on a single record medium and a second mode of operation in which visible images are to be formed in at least two different colors on a single record medium during a single cycle of operation, (b) the external data processing means being operative to supply to the internal data processing means data containing image data representative of visible images to be formed on a record medium and control data containing first control data for selecting one of the first and second modes of operation, second control data defining at least two contiguous areas within which visible images are to be formed on a record medium in the second mode of operation, third control data indicating the color in which visible images are to be formed on a record sheet in the first mode of operation or the colors in which visible images are to be formed on a record sheet in the second mode of operation, and fourth control data specifying the colors in which visible images are to be formed on a record sheet in the second mode of operation or the colors in which visible images are to be formed on a record sheet in the second mode of operation, (c) the printer apparatus comprising latent image carrying means having a photoconductive surface on which a page of electrostatic latent images arranged in rows, latent image forming means responsive to the image data through the internal data processing means for producing rows of electrostatic latent images on the photoconductive surface, the rows of latent images being to be formed successively in a predetermined direction with respect to the surface, and a plurality of converting means each operative to convert the latent images into visible images on a record medium when activated, each of the converting means being responsive to the third or fourth control data through the internal data processing means for converting the latent images into visible images in the color specified by the third control data or in the colors specified by the fourth control data, (d) the internal data processing means comprising first data generating means responsive to the first control data through the internal data processing means for generating variable data ($E_{INC}$) defining a location a row of images within the page of electrostatic latent images, the variable data being variable as the rows of latent images are formed successively in the predetermined direction on the surface, second data generating means responsive to the second control data through the internal data processing means for generating reference data defining the boundary between the contiguous areas defined by the second control data, detecting means responsive to the reference data and the variable data for detecting whether or not the latter conforms to the former and generating a signal when it is determined that the variable data conforms to the reference data, activating means responsive to the first control data and the third or fourth control data through the internal data processing means for activating one of the converting means in response to the first control data, the activating means being further responsive to the signal from the detecting means for activating another converting means and de-activate the converting means which has been activated in response to the first control data.

BRIEF DESCRIPTION OF THE DRAWINGS

The features and advantages of an image recording system according to the present invention will be more clearly appreciated from the following description taken in conjunction with the accompanying drawings in which:

FIGS. 3A and 3B are fragmentary cross sectional views each showing, to an enlarged scale, the construction of one of the developing units provided, in different conditions, in the image reproducing system of the printer apparatus illustrated in FIG. 2;

FIG. 4 is a plan view, partly in section, of the developing unit illustrated in FIGS. 3A and 3B;

FIG. 8 is a flowchart showing an example of the main routine program to be executed by a local control unit 154 under the control of a host control unit included in the control arrangement illustrated in FIG. 6;

FIG. 13 is a flowchart showing the details of the laser generator control subroutine program included in the routine program illustrated in FIG. 12;

FIG. 15 is a flowchart showing the details of the subroutine program included in the routine program illustrated in FIGS. 14A, 14B and 14C.

DESCRIPTION OF THE PREFERRED EMBODIMENTS

Figure 1:
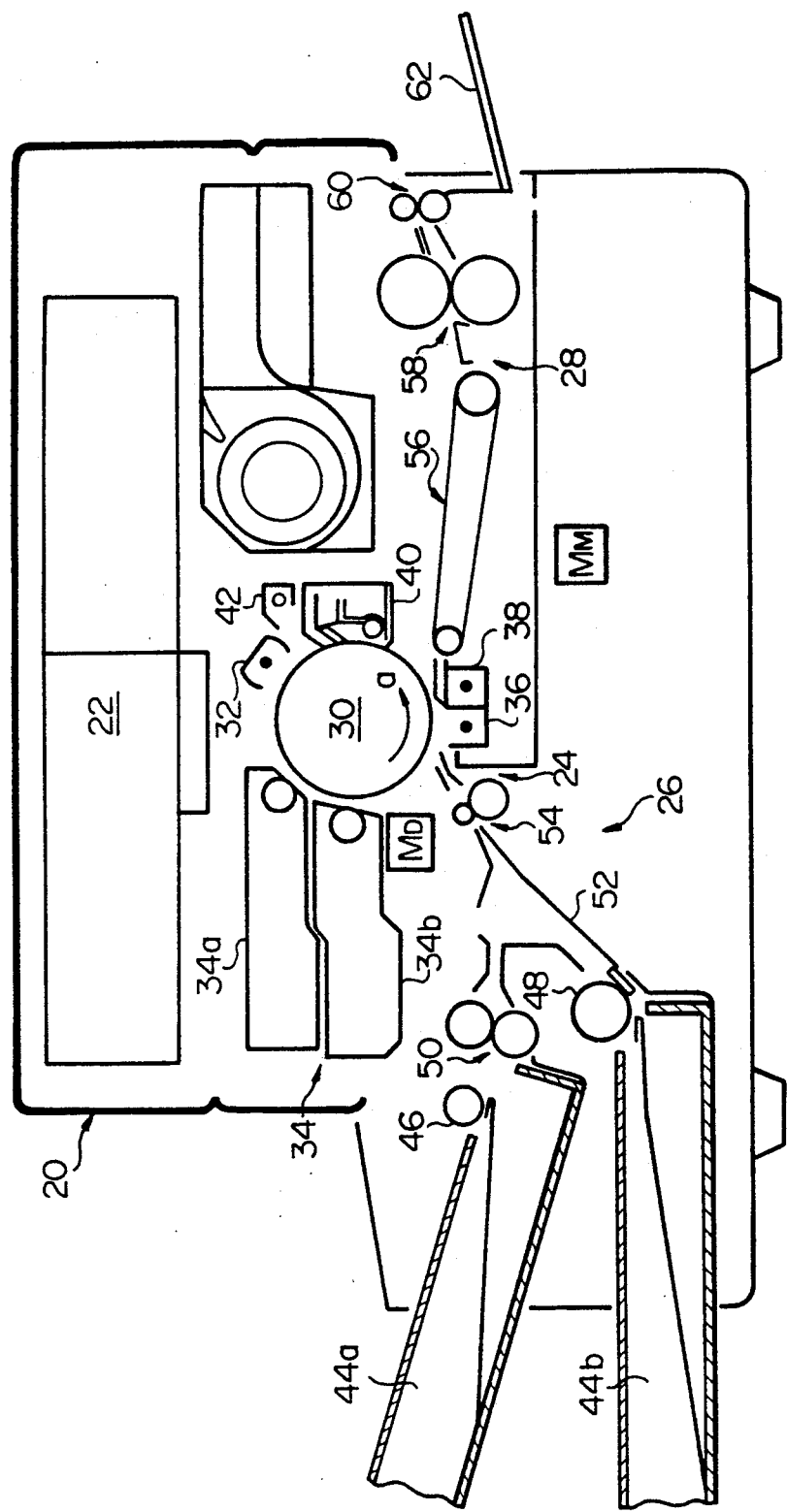
FIG. 1 is a side elevation view showing the general mechanical construction and arrangement of a typical example of a printer apparatus which may form part a preferred embodiment of an image recording system according to the present invention.

As shown in FIG. 1, a printer apparatus embodying the present invention comprises a housing structure 20 having a laser generator unit 22 incorporated therein as illustrated schematically. The construction and principle of operation of a laser generator unit 22 is well known in the art and as such will not be herein described and shown.

During operation of the apparatus, a beam of laser carrying the information representative the images to be printed out is emitted from this laser generator unit 22 and is directed downwardly to an image reproduction system 24 also housed within the housing structure 20. The images carried by the light beam are provisionally recorded in the form of electrostatic latent images, which are then developed into visible toner images through an electrophotographic process performed by the image reproduction system 24. The visible toner images are transferred to any record medium such as typically a sheet of paper (hereinafter referred to as print sheet) transported by a print sheet feed mechanism 26 and the print sheet now carrying the reproduced images is withdrawn out of the apparatus by means of an image-fixing and sheet discharge system 28.

The image reproducing system 24 of the apparatus comprises a cylindrical image transfer drum 30 having a photoconductive peripheral surface. The laser beam emanating from the laser generator unit 22 is incident on the peripheral surface of this photoconductive drum 30. The drum 30 is rotatable about its center axis in a direction indicated by arrow a and is driven for rotation at a fixed peripheral speed by means of a main drive motor $M_M$ of the apparatus. The image reproducing system 24 further comprises a main charger 32 to sensitize the photoconductive peripheral surface of the drum 30. Posterior to the path of light from the mirror 52 to the image transfer drum 30 is located an image develop stage 34 which is herein shown as including two, first and second image developing units 34a and 34b detachably mounted in the apparatus and each having a stock of a developer powder composed of a mixture of electrostatically charged carrier particles and black or otherwise colored toner particles. In the description to follow, it will be assumed by way of example that a powder containing red-colored toner particles is stored in the first image developing unit 34a and a powder containing black-colored toner particles stored in the second image developing unit 34b.

In the image develop stage 34 of the printer apparatus is further provided a drive motor $M_D$ by means of which the rotatable members forming part of each of the first and second image developing units 34a and 34b are to be driven for rotation for applying toner particles to the peripheral surface of the image transfer drum 30 from a selected one of the image developing units 34a and 34b, as will be described in more detail. Posterior to the image develop stage 34 in turn is provided an image transfer charger 36 which is operative to charge the print sheet so that the toner images formed on the image transfer drum 30 are transferred to the print sheet. The print sheet thus having the toner images carried thereon is cleared of charges by a separation charger 38 which is located posterior to the transfer charger 36. There is further provided a drum cleaner unit 40 which removes any residual toner particles from the image transfer drum 30. The drum cleaner unit 40 herein shown (FIG. 2) is of the type using a blade 42a to scrape off residual toner particles from the peripheral surface of the image transfer drum 30 and stored in a waste toner collector 42b. Posterior to this cleaner unit 40 in turn is located a charge eraser lamp 42 which irradiates the cleaned peripheral surface of the drum 30 to eliminate the charges which may be left thereon.

The print sheet feed mechanism 26 of the printer apparatus is provided in conjunction with first and second paper supply cassettes 44a and 44b detachably fitted to the housing structure 20 and which respectively have encased therein stocks of print sheets of different sizes. The print sheet feed mechanism 26 per se comprises first and second print sheet supply rollers 46 and 48 associated with the cassettes 44a and 44b, respectively. Each of these rollers 46 and 48 is driven for rotation for picking up print sheets one after another from the stack of paper in the associated one of the cassettes 44a and 44b. A print sheet picked up from the first paper supply cassette 44a by the roller 46 is passed through a first pair of guide rollers 50 and by way of a guide plate 52 toward the image transfer drum 30. A print sheet picked up from the second paper supply cassette 44b by the roller 48 is passed directly through the guide plate 52 toward the image transfer drum 30.

Immediately posterior to the image develop stage 34 is provided a pair of timing rollers 54. A print sheet which has been transported toward the image transfer drum 30 through the guide plate 52 either from the first paper supply cassette 44a or from the second paper supply cassette 4b is brought into contact with the peripheral surface of the drum 30 past these timing rollers 54. Each of the print sheet supply rollers 46 and 48, guide rollers 50 and timing rollers 54 are driven for rotation from the main drive motor $M_M$ of the apparatus by respectively associated solenoid-operated clutches (not shown).

A print-sheet transport belt assembly 56 is positioned posterior to the area where the print sheet is to be separated from the image transfer drum 30. The print sheet separated from the drum 30 is thus conveyed rearwardly through the belt assembly 56 to an image fixing assembly 58 provided at the rear of the belt assembly 56. The toner particles carried on the print sheet are thus thermally fused and fixed on the print sheet by this image fixing assembly 58. The print sheet released from the image fixing assembly 58 is withdrawn from the apparatus through a pair of paper discharge rollers 60 and is stacked on a paper discharge tray 62. Further shown provided in the apparatus shown is a forced-air cooling fan 64 for blowing hot air out of the apparatus.

Figure 2:
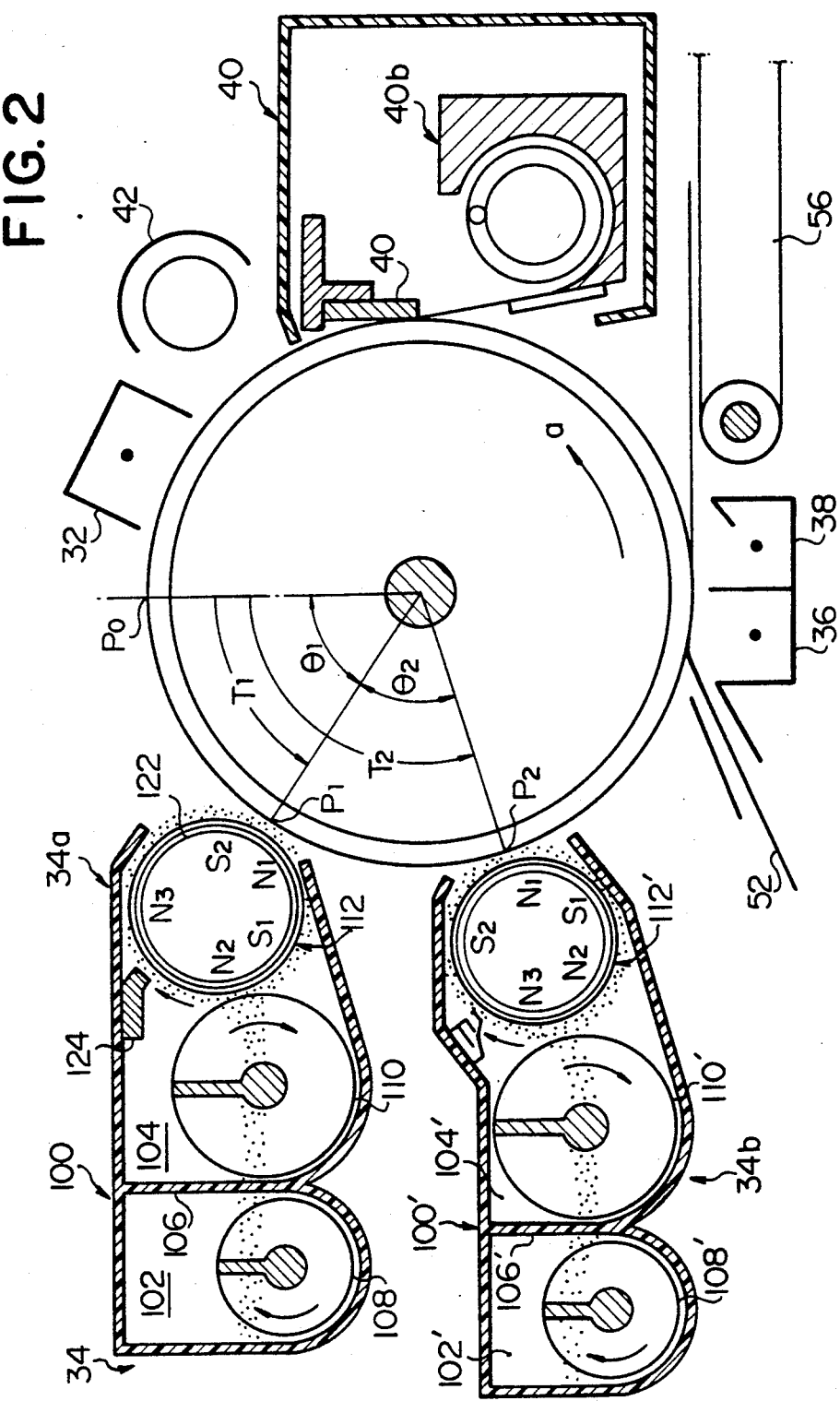
FIG. 2 is a cross sectional view showing the detailed construction and arrangement of an image reproducing system included in the printer apparatus illustrated in FIG. 1.
Figure 3A:
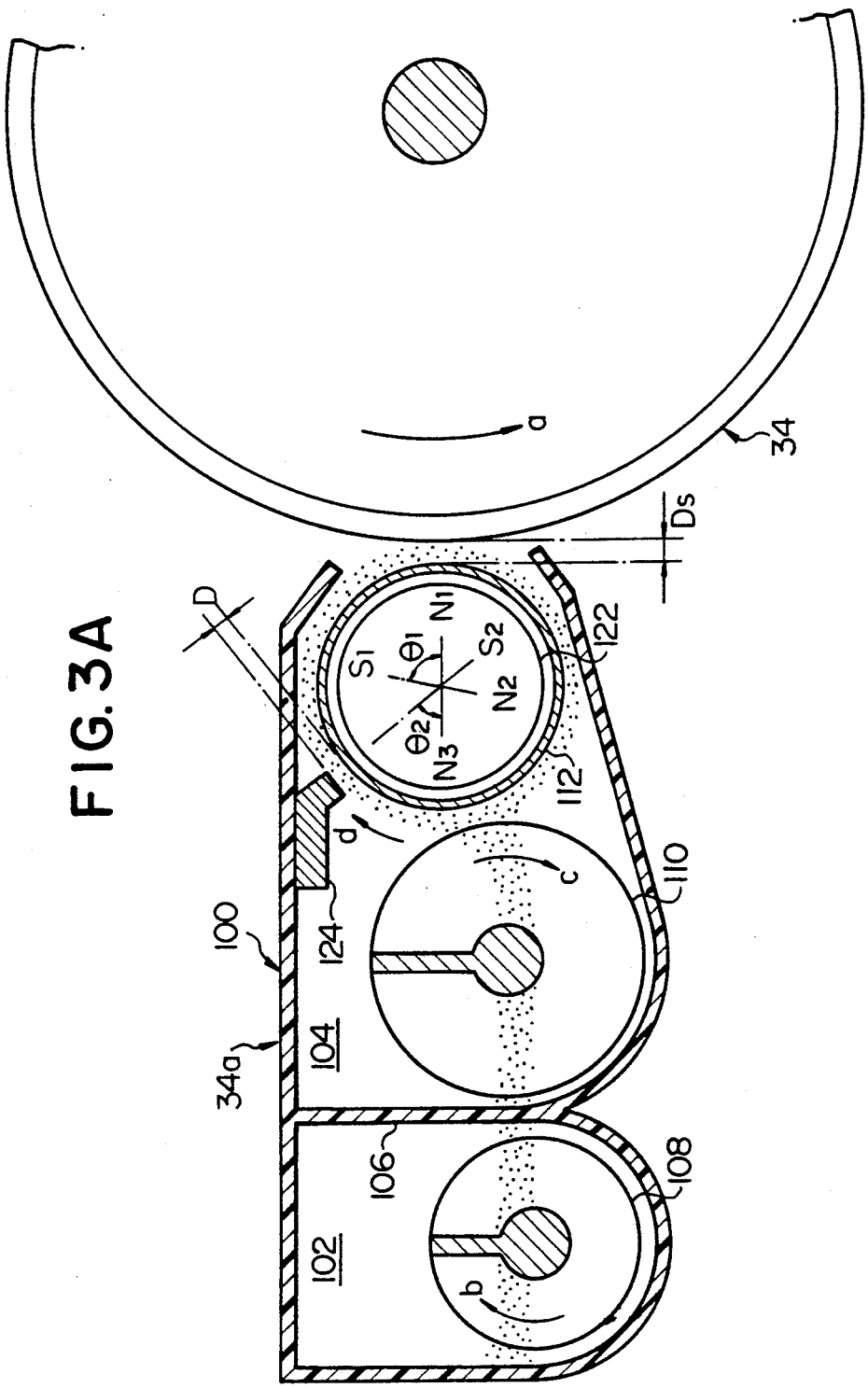

FIG. 2 shows the detailed construction and arrangement of the image reproducing system 24. The two image developing units 34a and 34b of the stage 34 being essentially similar in construction, further details of the construction of only the first image developing unit 34a are shown in FIGS. 3A, 3B and 4 as being representative of those of the two. The members and elements forming the second developing unit 34b which correspond to those of the first developing unit 34a are represented by numerals similar to those used for the former with a prime affixed to each of the numerals.

As will be seen from FIGS. 2, 3A, 3B and 4, the image developing unit 34a comprises a housing structure 100 defining a storage chamber 102 and a transfer chamber 104. These chambers 102 and 104 are separate from each other by a partition wall 106 forming part of the housing structure 100 and communicate with each other at the opposite longitudinal ends of the partition wall 106 as will be seen from FIG. 4. Positioned within the storage chamber 102 is a feed screw 108 rotatable in the direction of arrow b and having opposite end portions 108a and 108b journaled in opposite end walls 100a and 100b, respectively, of the housing structure 100. The developer powder stored in the storage chamber 102 is thus distributed from the vicinity of one end of the partition wall 106 to the vicinity of the other along the screw 108 and is fed into the toner transfer chamber 104 as the screw 108 is driven for rotation in the storage chamber 102.

Within the transfer chamber 104 are provided a transfer roller 110 and a hollow, cylindrical toner applicator sleeve 112. The transfer roller 110 is positioned between the feed screw 108 and sleeve 112 and also has opposite end portions 110a and 110b journaled in the opposite end walls 100a and 100b, respectively, of the housing structure 100. The transfer roller 110 is rotatable in the direction of arrow c so that the developer powder fed from the feed screw 108 is passed by the roller 110 over to the sleeve 112 as the screw 108 and roller 110 are driven for rotation respectively in the directions of arrows b and c as indicated in FIGS. 3A and 3B. The sleeve 112 is positioned close to the image transfer drum 30 to form a gap $D_S$ between the peripheral surface of the drum 30 and the outer peripheral surface of the applicator sleeve 112. The sleeve 112 has an end portion 112a journalled in one end wall 100a of the housing structure 100 and is also rotatable in the direction of arrow d.

The end portion 108a of the feed screw 108 and the end portion 110a of the transfer roller 110 have respectively carried thereon pulleys between which is passed an endless drive belt 114 as shown in FIG. 4. Likewise, the end portion 110a of the transfer roller 110 and the end portion 112a of the sleeve 112 have respectively carried thereon pulleys between which is passed an endless drive belt 116. The end portion 110a of the transfer roller 110 thus carrying the pulleys associated with both of the drive belts 114 and 116 has further carried thereon a gear 118 which is in mesh with a gear 120 carried on the output shaft of the previously mentioned drive motor $M_D$.

The applicator sleeve 112 is constructed of a non-magnetic material having a finely roughened outer peripheral surface and has accommodated therein a cylindrical magnetic rotor 122. The magnetic rotor 122 is rotatable within the sleeve 112 about the center axis of the sleeve 112 and has opposite end portions 122a and 122b, one journalled in a socket 112c formed in an end wall portion of the sleeve 112 and the other journalled in the end wall 100b of the housing structure 100 as indicated by broken lines in FIG. 4.

The magnetic rotor 122 has embedded therein a total of five permanent magnet members each extending axially of the rotor 122 and consisting of five magnet members $S_1$, $N_1$, $S_2$, $N_2$ and $N_3$, as will be seen from FIGS. 3A and 3B. These magnet members $S_1$, $N_1$, $S_2$, $N_2$ and $N_3$ are angularly spaced apart from each other about the center axis of the rotor 122 with, particularly, the magnet members $N_1$ and $S_1$ angularly spaced apart an angle $\theta_1$ of, for example, 80 degrees. The magnet members $S_1$, $N_1$, $S_2$, $N_2$ and $N_3$ may be selected such that the magnet member $N_1$ has the largest flux density of 1000 Gauss, each of the magnet members $S_1$ and $S_2$ has a smaller flux density of 800 Gauss and each of the magnet members $N_2$ and $N_3$ has the smallest flux density of 500 Gauss. The magnetic rotor 122 is rotatable about the center axis thereof between an operative angular position in which the magnet member $N_1$ having the largest flux density located in proximity to the gap $D_S$ between the sleeve 112 and image transfer drum 30 as shown in FIG. 3A and an inoperative angular position turned through 40 degrees from the operative angular position clockwise in FIG. 3A and having the magnet members $S_1$ and $N_1$ equally spaced apart from the gap $D_S$ as shown in FIG. 3B.

In conjunction with the magnetic rotor 122 thus arranged with the magnet members $S_1$, $N_1$, $S_2$, $N_2$ and $N_3$ is provided a brush-height limit member 124 attached to the housing structure 100 and located to form a limiting gap $D_E$ over the outer peripheral surface of the applicator sleeve 112. When the magnetic rotor 122 is turned to the operative angular position about the center axis thereof as above defined, the magnet member $N_3$ is located at a predetermined angle $\theta_2$ to the radial direction of the rotor 122 aligned with the limiting gap $D_E$ as shown in FIG. 3A. This angle $\theta_2$ is also selected at about 40 degrees so that, when the rotor 122 is turned to the inoperative angular position thereof, the magnet member $N_3$ is located in close proximity to the ear-height limiting gap $D_E$ as shown in FIG. 3B.

Figure 5A:
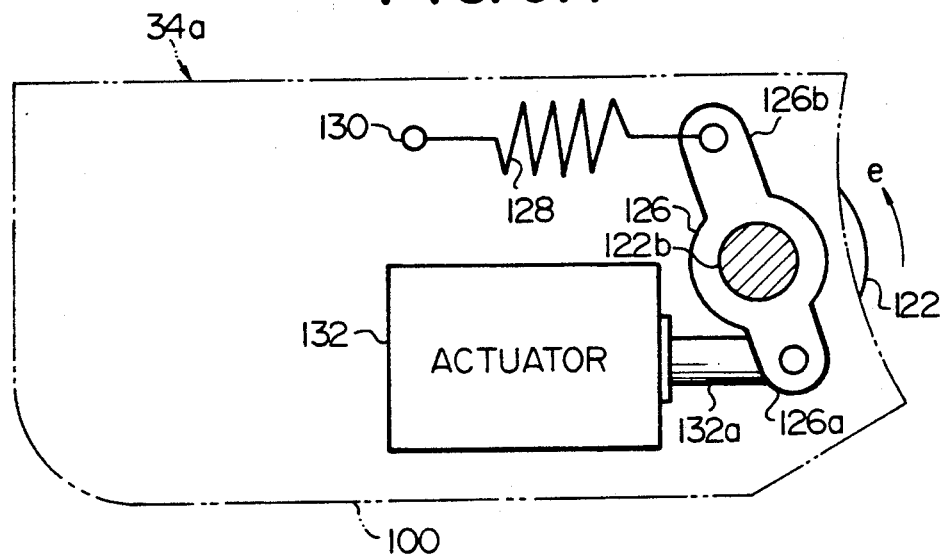
FIGS. 5A and 5B are schematic side elevation views each showing the arrangement for actuating a magnetic rotor included in the developing unit illustrated in FIGS. 3A, 3B and 4.
Figure 5B:
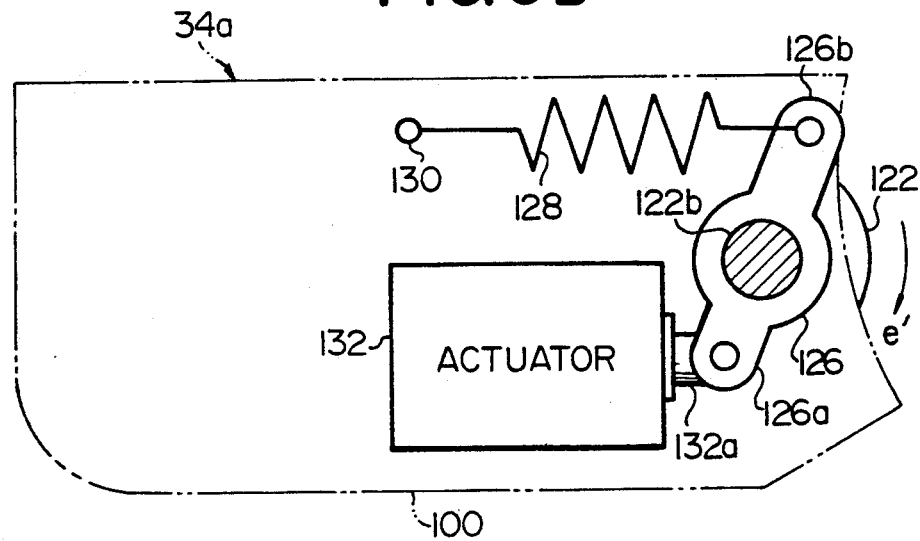

As shown is FIG. 4 and also in FIGS. 5A and 5B, the image developing unit 34a further comprises a control lever 126 fixedly carried on the end portion 112b of the magnetic rotor 122 and having diametrically opposite arm portions extending from the end portion 122b. A helical tension spring 128 is anchored at one end to one arm portion 126a of the lever 126 and at the other to an anchor pin 130 projecting from the wall portion 100b of the housing structure 100. The lever 126 and accordingly the magnetic rotor 122 are thus biased to turn in the direction of arrow $e_1$ as shown in FIG. 5A about the center axis of the rotor 122. The direction of rotation of the rotor 122 as indicated by arrow $e_1$ is such that the rotor 122 turns toward the inoperative angular position thereof with respect to the image transfer drum 30.

A solenoid-operated actuator unit 132 has a plunger 132a pivotally connected to the other arm portion 126b of the control lever 126, which is thus forced to turn from the operative angular position to the inoperative angular position thereof against the force of the spring 128 when the actuator unit 132 is energized. When the actuator unit 132 is energized, the magnetic rotor 122 is turned to the operative angular position thereof against the force of the spring 126 so that the magnet member $N_1$ in the rotor 122 is located close to the gap $D_S$ between the sleeve 112 and image transfer drum 30. Under these conditions, the toner particles on the sleeve 112 may be transferred to the peripheral surface of the image transfer drum 30. When the solenoid-operated actuator unit 132 is then de-energized, the magnetic rotor 122 is caused to turn to the inoperative angular position thereof by the force of the spring 126 so that the magnet members $S_1$ and $N_1$ are equally spaced apart from the gap $D_S$. Under these conditions, there will be no brushes of toner-carrying carriers formed on the outer peripheral surface of the sleeve 112 in proximity to the gap $D_S$.

Each of the two developing units 34a and 34b of the image develop stage 34 being constructed and arranged as hereinbefore described, a desired one of the developing units 34a and 34b can be selected and actuated into operation for printing in red or black with the solenoid-operated actuator unit 132 of one of the developing units energized at a controlled timing.

The image recording system embodying the present invention has capabilities to print images in two different colors (which are red and black as above noted) on one face of a single print sheet during a single cycle of printing operation. Such a printing operation will be herein referred to as single-cycle two-colored mode of printing operation. The image recording system embodying the present invention has different modes of operation other than this single-cycle two-color mode of printing operation as is the case with ordinary known printers. These modes of operation other than the single-cycle two-color mode of printing operation will be herein collectively referred to as normal mode of printing operation. In the normal mode of printing operation, images are printed monochromatically, viz., either in red or in black in the case of the printer apparatus under consideration, throughout a print sheet.

Figure 6:
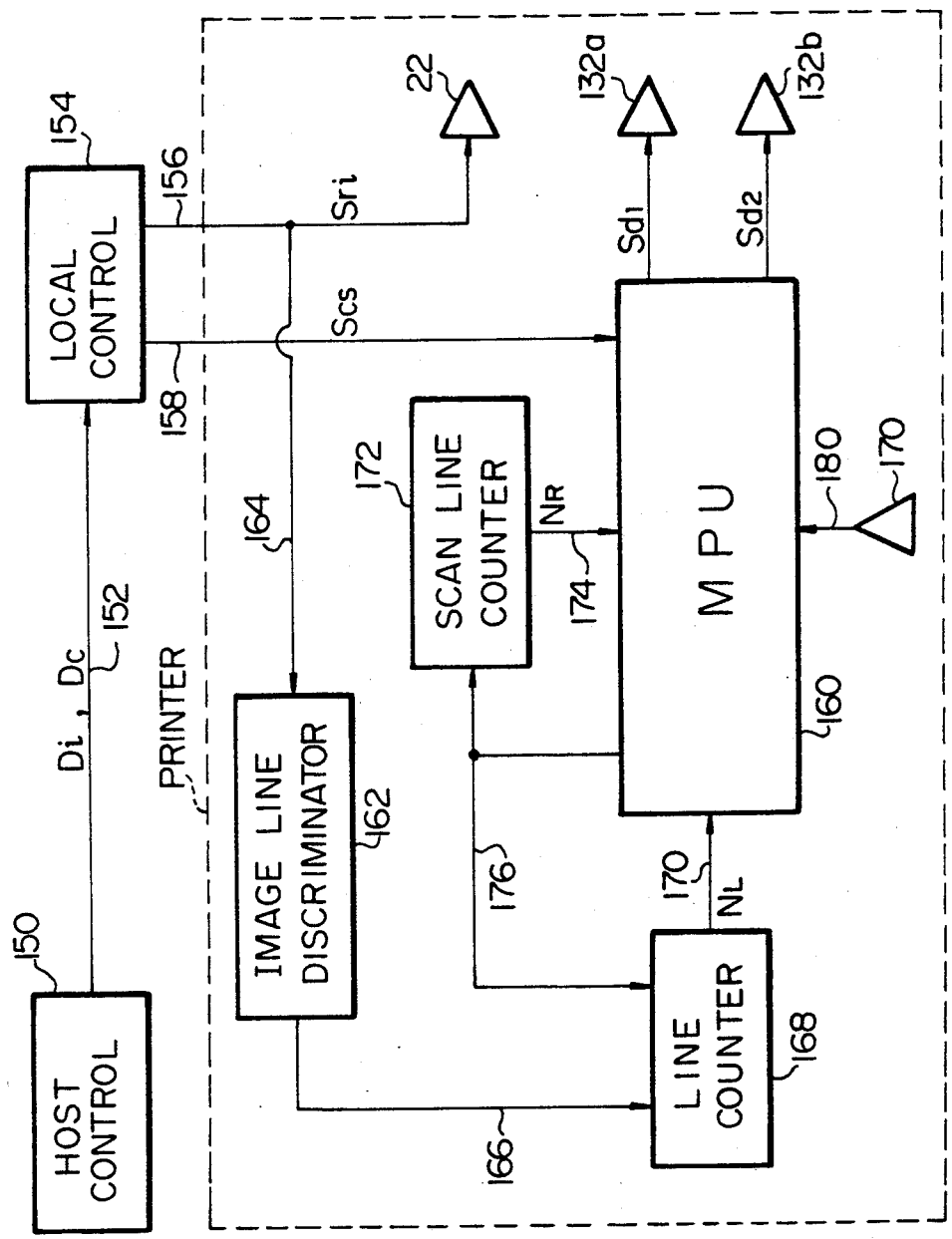
FIG. 6 is a block diagram showing the general configuration of the control arrangement which may form part of the image recording system embodying the present invention.

FIG. 6 is a block diagram showing the general configuration of the control arrangement which may form part of the image recording system embodying the present invention.

The control arrangement shown in FIG. 6 comprises a host control unit 150 implemented by, for example, a personal computer or a microprocessor incorporated in a word processor and a local control unit 154 connected to the host control unit 150 through a bus 152 to receive data from the host control unit 150. The local control unit 154 is implemented by a microprocessor and is exclusively associated with the printer apparatus which also forms part of the image recording system embodying the present invention. The data supplied from the host control unit 150 to the local control unit 154 contains image data $D_i$ representative of the images to be printed and control data $D_c$ which dictates the modes and conditions in which the images are to be printed. In the control data $D_c$ is contained an instruction for selecting the normal mode of operation or the single-cycle two-color mode of printing operation and the data predominant over the conditions in which any one of the first and second developing units 34a and 34b or both of the developing units 34a and 34b are to operate. The control data $D_c$ further contains instructions specifying the areas of a print sheet in which images are to be printed either in the normal mode of operation or in the single-cycle two-color mode of printing operation and the color or colors in which the images are to be printed in the normal mode or single-cycle two-color mode print areas.

The local control unit 154 which has received the image and control data $D_i$ and $D_c$ from the host control unit 150 produces real image data $S_{ri}$ representative of the images to be actually printed. The real image data $S_{ri}$ is produced in the form of bit maps from the image data $D_i$ received from the host control unit 150 and is once latched into an image data buffer (not shown) incorporated in the local control unit 154. The real image data $S_{ri}$ is then released from the image data buffer and transmitted through an image data bus 156 to the laser generator unit 22 of the printer apparatus described with reference to FIG. 1.

The local control unit 154 is further operative to process the control data $D_c$ received from the host control unit 150 and generates various status and command signals $S_{cs}$ to be predominant over the various phases and aspects of the printing operation to be performed by the printer apparatus. These status and command signals $S_{cs}$ are transmitted through a control data bus 158 to a microprocessor unit 160 incorporated in the printer apparatus per se and enables the microprocessor unit 160 to produce various control signals effective to activate the various electrically operated devices incorporated in the printer apparatus. Thus, the control signals produced by the microprocessor unit 160 include signals $S_{d1}$ and $S_{d2}$ effective to activate or de-activate the solenoid-operated actuator units included in the first and second developing units 34a and 34b of the image develop stage 34 of the printer apparatus. These actuator units of the first and second developing units 34a and 34b are herein respectively represented by 132a and 132b.

By preference, the real image data $S_{ri}$ produced by the local control unit 154 may also be supplied by way of a data bus 164 to a print line discriminator 162 which is arranged to inspect the supplied image data $D_{ri}$ and discriminate the lines of images, or print lines, to be printed on a print sheet. Information indicating the print lines thus detected by the print line discriminator 162 is transmitted through a data bus 166 to a line counter 168 which counts the number $N_L$ of the print lines forming a page of printed images to be produced on a print sheet. The data representative of this number $N_L$ of the print lines is supplied through a data bus 170 to the microprocessor unit 160.

There may be further provided by preference a raster scanning line counter 172 which is operative to count the number, $N_R$, of raster scanning lines generated by the laser beam from the laser generator unit 22 to form rows of electrostatic latent images on the photoconductive image transfer drum 30. The data representative of this number $N_R$ of the raster scanning lines is supplied through a data bus 170 to the microprocessor unit 160. The line counter 168 and raster scanning line counter 172 operate under the control of the microprocessor unit 160 through a control bus 176. The raster scanning lines are detected by a raster scanning line sensor 178 connected to the microprocessor unit 160 through a line 180.

The data thus produced by the hardware arrangement including the print line discriminator 162, line counter 168 and raster scanning line counter 172 can be processed by the microprocessor unit 160 to produce digital data representative of the number $N_L$ of print lines and the number $N_R$ of raster scanning lines. The hardware arrangement may also be used for the generation of digital data representative of the distance of a row of images from, for example, the leading end of a print sheet. In the description to follow, however, it is assumed that such data are to be generated simply by a software approach using information available from the described construction and arrangement of the printer apparatus, host control unit 150, local control unit 154 and microprocessor unit 160.

During single-cycle two-colored mode of printing operation of the printer apparatus of the image recording system embodying the present invention, images are printed in one of the two available colors in at least one area of a print sheet and in the other color in another area or other areas of the print sheet. Thus, the first and second developing units 34a and 34b provided at the image develop stage 34 of the printer apparatus are selectively put into operation under the control of the local control unit 154 and microprocessor unit 160 on the basis of the control data $D_c$ contained in the data supplied from the host control unit 150. For this purpose, one of the developing units 34a and 34b is first put to use at an incipient stage of a cycle of single-cycle two-color mode of printing operation and thereafter the developing unit which has been in operation is de-activated and, in turn, the other of the developing units 34a and 34b is put into operation. The exchange between the two developing units 34a and 34b is effected through detection of a boundary line between the specified areas of the print line or of a page of image information in the form of electrostatic latent images produced on the photoconductive image transfer drum 30. The boundary line between the specified areas of the print line or of the page of image information is detected from the control data $D_c$ originating in the host control unit 150 and may be defined with respect to a predetermined reference position of the sheet or the page of image information in terms of any of the following three different criteria:

(1) the distance $N_D$ of the boundary from the reference position of the print sheet or the page of image information in the form of electrostatic latent images produced on the image transfer drum 30, (2) the number $N_L$ of lines of images or "print lines" as herein referred to, to be formed or left blank anterior to the boundary between the specified print areas, and (3) the number $N_R$ of raster scanning lines required to scan the peripheral surface of the photoconductive image transfer drum 30 until the boundary between the specified print areas is reached.

Figure 7A:
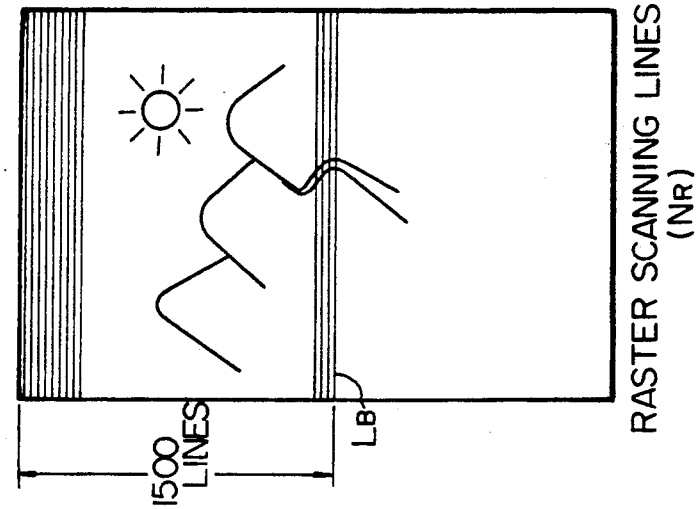
FIGS. 7A, 7B and 7C are diagrams showing examples of pages of information each having a boundary between contiguous areas defined in terms of each of the criteria used in the system embodying the present invention.
Figure 7B:
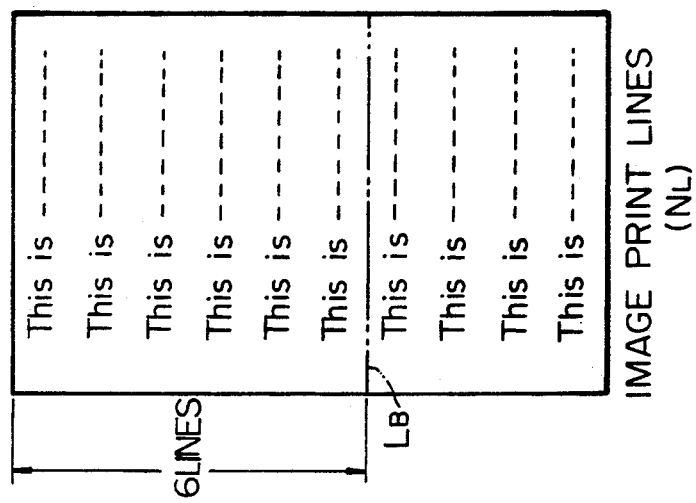
Figure 7C:
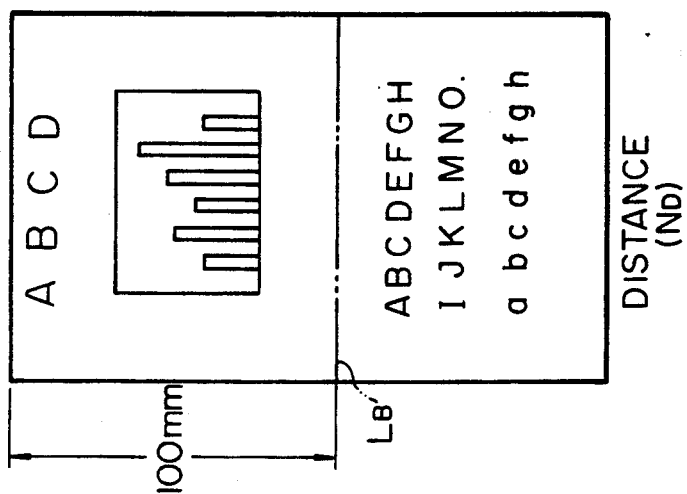

The predetermined reference position of the print sheet or the page of image information with respect to which a boundary of a print area defined within the print sheet or page is typically the leading end of the print sheet or the leading end of the page of image information at which scanning is to be started for the formation of the page of image information. FIGS. 7A, 7B and 7C show pages of image information in which the boundary line $L_B$ between the two contiguous print areas is thus defined in terms of the distance $N_D$ of the boundary from the leading end of the page of image information (FIG. 4A), the number $N_L$ of print lines (FIG. 4B), and the number $N_R$ of raster scanning lines (FIG. 4C). As indicated herein, the distance $N_D$ of 100 mm is corresponds to 6 print lines and 1500 raster scanning lines.

FIG. 8 shows the main routine program to be executed by the local control unit 154 under the supervision of the host control unit 150 included in the control arrangement hereinbefore described. The main routine program starts with the printer apparatus switched in and first executes subroutine program A01 to transfer image and control data $D_i$ and $D_c$ from the host control unit 150 to the local control unit 154. Subsequently to the subroutine program A01 is executed subroutine program A02 through which real image data representative of the images to be actually printed are produced in the form of bit maps from the image data $D_i$ received by the local control unit 154, the real image data signals being stored into an image data buffer (not shown) incorporated in the local control unit 154.

The subroutine program A02 is followed by a printer control signal generating subroutine program A03 through which signals to control the various aspects of the operation to be carried out by the printer apparatus are produced and output from the microprocessor unit 160 in accordance with the command signals $S_{cs}$ supplied from the local control unit 154. As has been noted, these command signals $S_{cs}$ are produced in the local control unit 154 on the basis of the instructions contained in the control data $D_c$ received by the local control unit 154 and are transferred via the data bus 158 to the microprocessor unit 160. The control signals thus produced and output through this subroutine program A03 include those for selecting one of the two developing units 34a and 34b of the image develop stage 34, those for executing printing operation either in the normal mode or in the single-cycle two-color mode, and those for generating data defining the print areas in which images are to be printed in different colors, respectively. The details of the printer control signal generating subroutine program A03 will be hereinafter described with reference to FIG. 9.

It is then confirmed at step A04 whether or not there is a request from the host control unit 150 for starting the printing operation and, if it is found that there is such a request from the host control unit 150, the local control unit 154 executes subroutine program A05 to generate and output a command signal requesting the printer apparatus to start a cycle of printing operation. In the presence of a request for starting the printing operation, the local control unit 154 outputs real image data signals $S_{ri}$ from the image data buffer incorporated therein. The real image data signals $S_{ri}$ are supplied through the data bus 156 to the laser generator unit 22 to activate the laser generator unit 22 to generate a laser beam carrying the image information. Through execution of the subroutine program A05, the local control unit 154 thus controls the various phases and aspects of the operation to be performed by the printer apparatus in accordance with the data stored therein and supplies the command signals $S_{cs}$ to the microprocessor unit 160. The details of the printer control subroutine program A05 will be hereinafter described with reference to FIG. 11.

The printing mode of operation is established until it is confirmed at step A06 that the printing for the currently given print sheet is complete. On termination of the complete cycle of printing operation if the answer for the step A04 is given in the negative, the main routine program reverts to the subroutine program A01 and executes the subroutines and steps of the routine program repeatedly.

Figure 9:
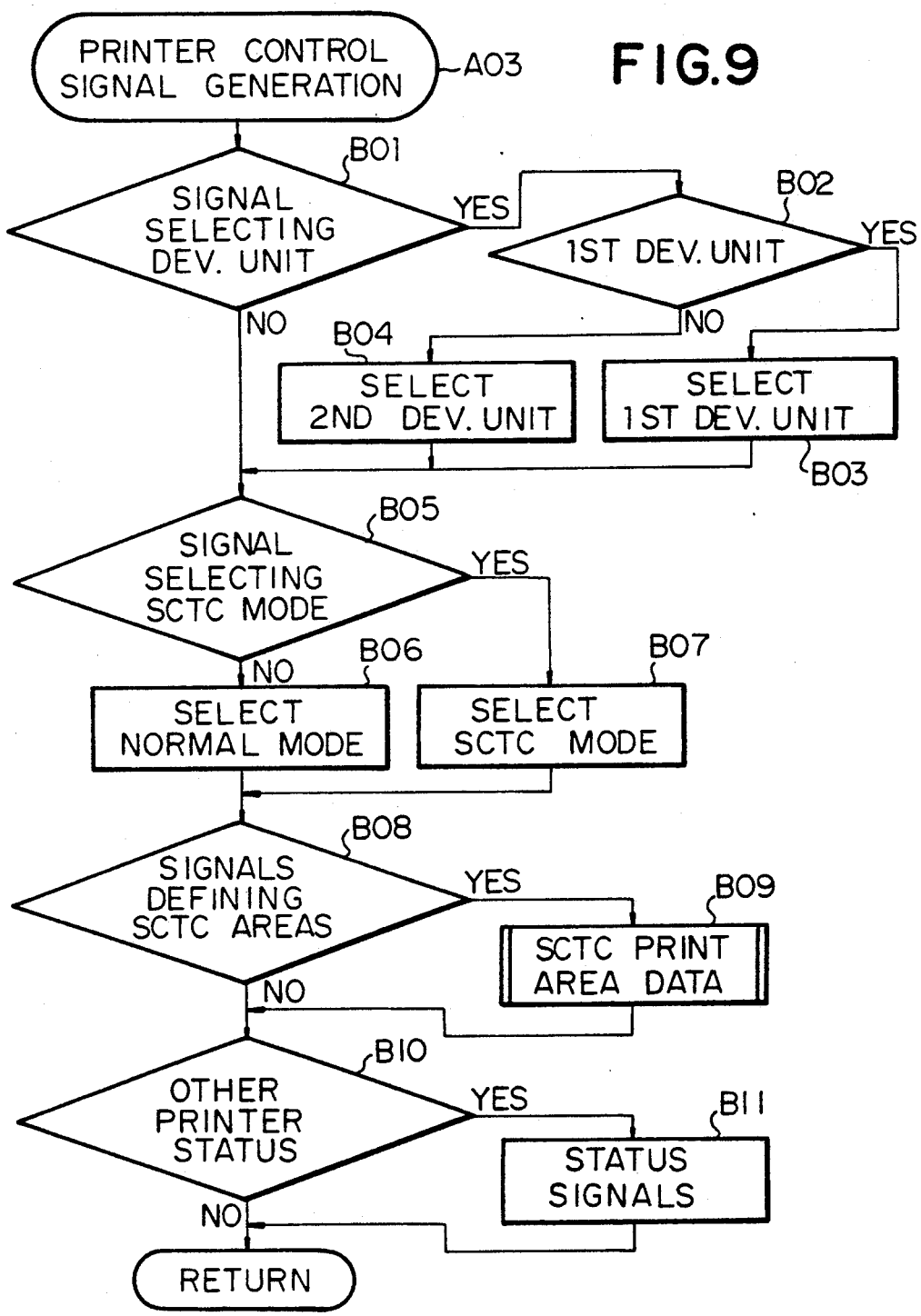
FIG. 9 is a flowchart showing the details of the printer control signal generating subroutine program included in the main routine program illustrated in FIG. 8.

FIG. 9 shows the details of the printer control signal generating subroutine program included in the hereinbefore main routine program. It may be noted that the steps forming the routine program herein shown are only part of the various steps included in the printer control signal generating subroutine program to be executed by the local control unit 154. Thus, the local control unit 154 incorporated in the control arrangement herein shown is to execute a number of routine programs other than those herein shown, including those for the selection of the print-sheet supply cassette to be used for a cycle of printing operation. The other steps to be executed by the local control unit 154 may further include those for controlling the functions of the various accessory units and equipment which may be additionally attached to or associated with the printer apparatus under consideration. The description to follow is however principally directed at the single-cycle two-color mode of printing operation of the apparatus and, as such, will deal only with the steps predominant over the selection of the developing unit 34a or 34b and the execution of the single-cycle two-color mode of printing operation. As will be described, the steps to execute the single-cycle two-color mode of printing operation include those required for the generation and output of a signal for the selection and establishment of either the normal mode of printing operation or the single-cycle two-color mode of printing operation and signals for defining the boundary line between the print areas within which images are to be printed in different colors.

Referring to FIG. 9, the printer control signal generating subroutine program A03 starts with a decision step B01 at which the local control unit 154 detects whether or not the control data $D_c$ supplied from the host control unit 150 contains an instruction for selecting a particular developing unit. If it is found at this step B01 that there is such an instruction contained in the control data $D_c$ from the host control unit 150, the local control unit 154 further detects at step B02 whether or not the first developing unit 34a is selected by the instruction from the host control unit 150. If the answer for the step B02 is given in the affirmative, the local control unit 154 proceeds to step B03 to produce a command signal for selecting the first developing unit 34a at the image develop stage 34 of the printer apparatus. If the answer for the step B02 is given in the negative, then the local control unit 154 proceeds to step B04 to produce a command signal for selecting the second developing unit 34b at the image develop stage 34 of the printer apparatus.

Subsequently to step B03 or step B04 or if it is found at step B01 that the control data $D_c$ received from the host control unit 150 contains no instruction for selecting a particular developing unit, the local control unit 154 detects at step B05 whether or not the control data $D_c$ supplied from the host control unit 150 contains an instruction for selecting the single-cycle two-color (SCTC) mode of printing operation. If it is found at this step B05 that there is no such instruction contained in the control data $D_c$ received from the host control unit 150, the local control unit 154 proceeds to step B06 to produce a command signal for selecting the normal mode of printing operation as the mode of operation to be carried out by the printer apparatus. If it is found at step B05 that the control data $D_c$ received from the host control unit 150 contains the instruction for selecting the single-cycle two-color mode of printing operation, the local control unit 154 proceeds to step B07 to produce a signal for selecting the single-cycle two-color mode of printing operation as the mode of operation to be carried out by the printer apparatus.

The step B06 or step B07 is followed by a step B08 at which is detected whether or not the control data $D_c$ supplied from the host control unit 150 contains any data defining the print areas in which images are to be printed in different colors, respectively. If it is found at this step B08 that there is such data contained in the control data $D_c$ received from the host control unit 150, the local control unit 154 proceeds to subroutine program B09 to produce data signals defining the boundary between the print areas in which images are to be printed in different colors, respectively. The details of this printer control subroutine program B09 will be hereinafter described with reference to FIG. 10.

After execution of the subroutine program step B09 or if it is found at step B08 that the control data $D_c$ received from the host control unit 150 contains no data defining the boundary between such print areas of the print sheet, the local control unit 154 proceeds to step B10 to check whether or not the control data $D_c$ supplied from the host control unit 150 contains an instruction for establishing any other operational state in the printer apparatus. If it is found at this step B10 that there is such an instruction contained in the control data $D_c$ received from the host control unit 150, the local control unit 154 proceeds to subroutine program B11 to produce signals indicating the conditions in which the operational state required is to be established in the printer apparatus. Subsequently to step B11 or if it is found at step B11 that the control data $D_c$ from the host control unit 150 contains no instruction requiring establishment of the particular operational state in the printer apparatus, the local control unit 154 reverts to the step A04 of the main routine program described with reference to FIG. 8.

Figure 10:
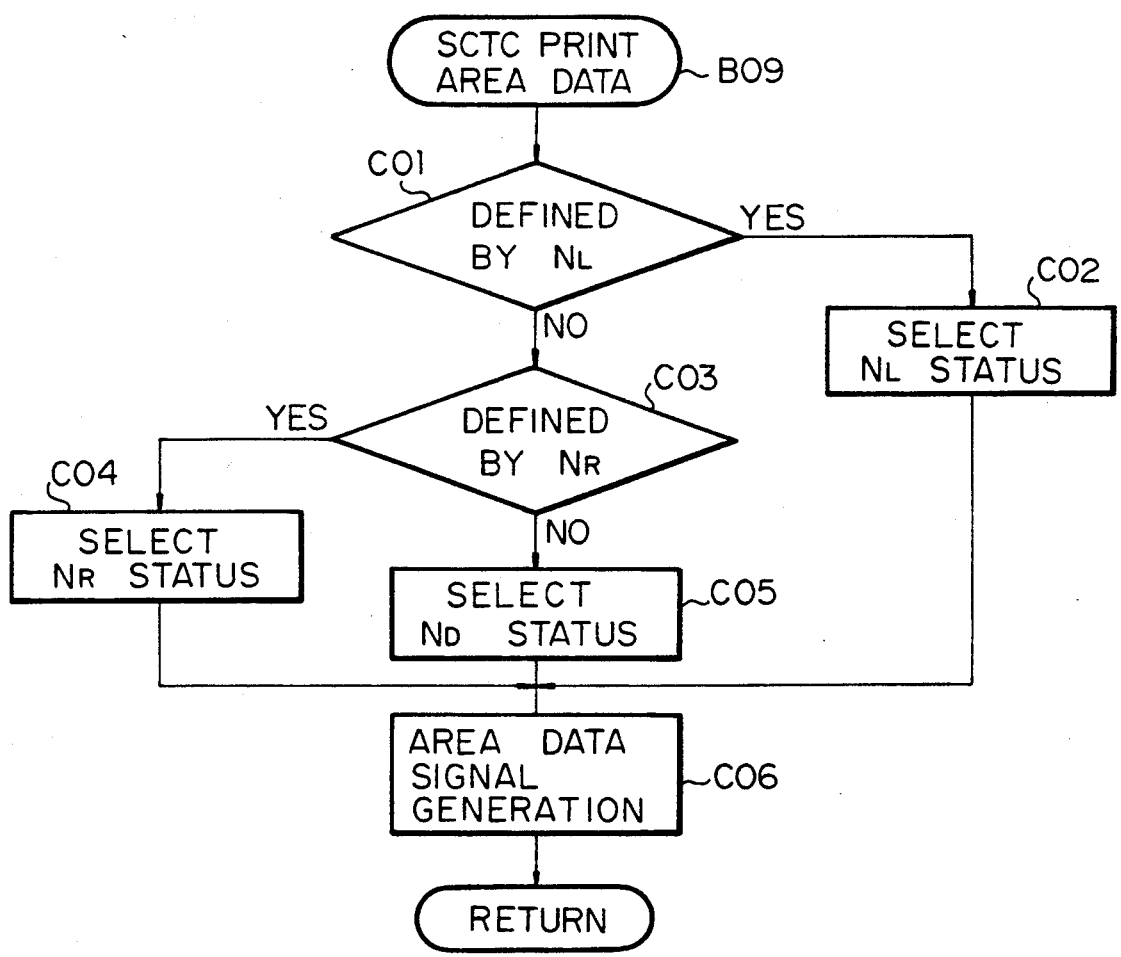
FIG. 10 is a flowchart showing the details of the single-cycle two-color (SCTC) print area data generating subroutine program included in the routine program illustrated in FIG. 9.

FIG. 10 shows the details of the subroutine program B09 included in the routine program illustrated in FIG. 9 to produce data signals defining the boundary between the print areas in which images are to be printed in different colors, respectively, as hereinbefore described.

In the single-cycle two-color (SCTC) print area data generating subroutine program B09, it is first checked to see if the control data defining the boundary between the print areas in which images are to be printed in different colors is formulated in terms of any of the three different criteria. As described previously, these three different criteria consist of the distance $N_D$, the number $N_R$ of raster scanning lines, or the number $N_L$ of print lines.

Thus, the subroutine program B09 starts with a decision step C01 to check whether or not the control data defining the boundary between the print areas in which images are to be printed in different colors is formulated in terms of the number $N_L$ of print lines. If the answer for this step C01 is given in the affirmative, the local control unit 154 proceeds to step C02 to establish a status in which the boundary between the print areas are to be defined in terms of the number $N_L$ of print lines. If the answer for the step C02 is given in the negative, then the local control unit 154 proceeds to step C03 to check whether or not the control data defining the boundary between the print areas is formulated in terms of the number $N_R$ of raster scanning lines required to scan the print sheet from the starting end of the print sheet. If the answer for this step C03 is given in the affirmative, the local control unit 154 proceeds to step C04 to establish a status in which the boundary between the print areas is to be defined in terms of the number $N_R$ of raster scanning lines. If the answer for the step C03 is given in the negative, viz., when it is determined that the boundary between the print areas is defined neither in terms of the number $N_L$ of print line nor in terms of the number $N_R$ of raster scanning lines, the local control unit 154 proceeds to step C05 to establish a status in which the boundary between the print areas are to be defined in terms of the distances $N_D$ from the starting end of the print sheet.

Subsequently to any of the steps C02, C04 and C05, the local control unit 154 proceeds to step C06 to generate data signals defining the boundary between the print areas in terms of any of the criteria thus detected to be currently valid. On execution of this step C06, the local control unit 154 reverts to the step B10 of the subroutine program A03 described with reference to FIG. 9.

Figure 11:
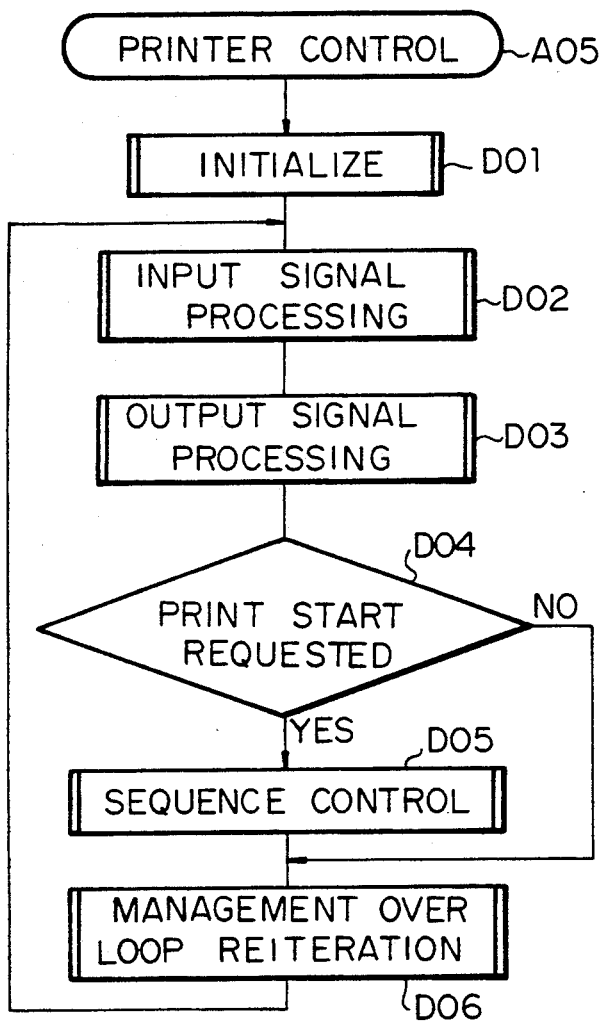
FIG. 11 is a flowchart showing the details of the printer control subroutine program included in the main routine program illustrated in FIG. 8.

FIG. 11 shows the details of the printer control subroutine program A05 included in the main routine program described with reference to FIG. 8. The printer control subroutine program A05 starts with a subroutine program D01 through which the operational conditions of the various component units and elements of the printer apparatus are initialized in accordance with the default rules memorized in the local control unit 154. After the printer apparatus has thus been initialized, the local control unit 154 executes steps D02 and D03 to process the signals to be input to and output from the printer apparatus and, thereupon, proceeds to a decision step D04 to detect whether or not there is present a signal requesting the start of a cycle of printing operation. If it is found at this step D04 that there is currently present such a signal, the local control unit 154 proceeds to a sequential printer control subroutine program D05 to execute a sequence of steps to control the various component units and elements of the printer apparatus. The details of this sequential control subroutine program D05 will be hereinafter described with reference to FIG. 12.

Subsequently to the sequential control subroutine program D05 or when the answer for the decision step D04 is given in the negative, the local control unit 154 proceeds to a loop time control subroutine program D06 to control the time duration allocated to each iteration of the loop of the steps D02 to D06 forming the subroutine program A05. After execution of the subroutine program D06, the local control unit 154 reverts to the step D02 of the subroutine program A05 to repeat the loop of the steps D02 to D06 as above described.

Figure 12:
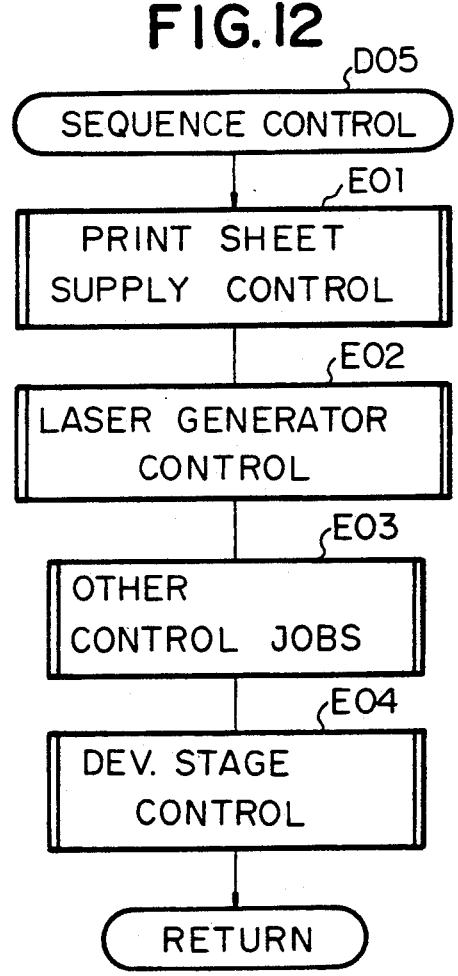
FIG. 12 is a flowchart showing the details of the sequential printer control subroutine program included in the routine program illustrated in FIG. 11.

FIG. 12 shows the details of the sequential printer control subroutine program D05 included in the routine program A05 hereinbefore described with reference to FIG. 11. The sequential printer control subroutine program D05 starts with a print sheet supply start subroutine program E01 through which the local control unit 154 outputs and supplies command signals to the microprocessor unit 160 to activate the solenoid-operated clutches (not shown) respectively associated with the print sheet supply rollers 46 and 48, guide rollers 50 and timing rollers 54 of the printer apparatus shown in FIG. 1. The rollers 46, 48, 50 and 54 associated with these clutches are now actuated and driven for rotation from the main drive motor $M_M$ to feed a print sheet to the photoconductive image transfer drum 30 from either the first paper supply cassettes 44a or the second paper supply cassette 44b depending on the paper size select instruction contained in the control data $D_c$ received from the host control unit 150.

The print sheet supply start subroutine program E01 is followed by a laser generator control subroutine program E02 through which the local control unit 154 outputs and supplies a command signal the the microprocessor unit 160 to activate the laser generator unit 22 of the printer apparatus shown in FIG. 1. The laser generator unit 22 to emit an image information carrying laser beam to the image transfer drum 30 to produce latent images on the peripheral surface of the drum 30 in accordance with the image data signals $S_{ri}$ supplied from the local control unit 154. The details of this laser generator control subroutine program D05 will be hereinafter described with reference to FIG. 13. The local control unit 154 then proceeds to subroutine program E03 to execute any other jobs required for the control of the printer apparatus. These jobs may include those which are to be executed to cope with any failure which may occur during operation of the printer apparatus.

After execution of the subroutine program E03, the local control unit 154 proceeds to an image develop stage control subroutine program E04 to output a control signal $S_{d1}$ to activate the solenoid-operated clutch 132a in the first developing unit 34a or the solenoid-operated clutch 132b in the second developing unit 34b. The clutch 132a or 132b in the first or second developing unit 34a or 34b is activated at a timing which is determined and controlled through execution of the laser generator control subroutine program E02. The details of this image develop stage control subroutine program E04 will be hereinafter described with reference to FIG. 14. Subsequently to the subroutine program E04, the local control unit 154 reverts to the subroutine program D06 of the routine program described with reference to FIG. 11.

FIG. 13 shows the details of the laser generator control subroutine program D05 included in the routine program described with reference to FIG. 12. To execute this laser generator control subroutine program D05, the local control unit 154 has incorporated therein a row or developing unit for counting the time duration for which the loop of the steps D02 to D06 of the printer control subroutine program A05 described with reference to FIG. 11 is executed recurrently after the laser generator unit 22 is activated to start scanning. The count value, $E_{INC}$, of such an developing unit is incremented repeatedly for each cycle of iteration through the loop of the steps D02 to D06 and thus stepwise increases as the image transfer drum 30 is turned about the center axis thereof. In the control arrangement of the image recording system embodying the present invention, the count value $E_{INC}$ of such an developing unit is used in executing the subroutine program D05 for the control of the laser generator unit 22, as will be understood more clearly as the description proceeds.

At an initial step F01 of the subroutine program D05 is checked whether or not the laser generator unit 22 is in operation. It being assumed that the laser generator unit 22 is currently not in operation, the answer for this decision step F01 is given in the affirmative so that the local control unit 154 then proceeds to step F02 to detect whether or not there is a request for activation of the laser generator unit 22. If it is found at this step F02 that there is such a request, the step F02 is followed by a step F03 by at which the local control unit 154 supplies a command signal to the microprocessor unit 160 to activate the laser generator unit 22 into operation and further by a step F04 at which the local control unit 154 resets the count value $E_{INC}$ of the developing unit. The local control unit 154 then reverts to the step F01 to repeat the subroutine program E04.

The laser generator unit 22 having been activated at step F03, the answer for the step F01 is given in the affirmative when the execution of the subroutine program E02 is thus repeated. In this instance, the local control unit 154 proceeds to step F05 to increment the count value $E_{INC}$ of the developing unit and further to a decision step F06 to detect whether or not the count value of a first internal timer of the local control unit 154 is currently zero. The first internal timer of the local control unit 154 is conditioned to count time for a first predetermined time duration $T_1$. If it is found at this step F06 that the count value of the first internal timer of the local control unit 154 is not zero, the step F06 is followed by a step F07 to decrement the current count value of the first internal timer of the local control unit 154. If it is found at the step F06 that the count value of the first internal timer is zero, the local control unit 154 then proceeds to step F08 to detect whether or not the count value of a second internal timer of the local control unit 154 is currently zero. The second internal timer of the local control unit 154 is conditioned to count time for a second predetermined time duration $T_2$. If it is found at this step F08 that the count value of the second internal timer of the local control unit 154 is not zero, the step F08 is followed by a step F09 to decrement the current count value of the second internal timer of the local control unit 154. Subsequently to this step F09 or if it is found at the step F08 that the count value of the second internal timer is zero, the local control unit 154 returns to the step F01 to further repeat the subroutine program E04.

The first predetermined time duration $T_1$ set by the first internal timer of the local control unit 154 is the period of time for which the image transfer drum 30 turns through a predetermined angle $\theta_a$ about the center axis thereof as shown in FIG. 2. This predetermined angle $\theta_a$ of turn of the image transfer drum 30 is such that an imaginary line assumed to extend on the peripheral surface of the image transfer drum 30 is turned from the location indicated at $P_o$ in FIG. 2 to the location $P_1$ closest to the toner applicator sleeve 112 of the first developing unit 34a. The imaginary line on the image transfer drum 30 is assumed to extend along the line at which the beam of light from the laser generator unit 22 is incident on the peripheral surface of the drum 30 at a given point of time. On the other hand, the second predetermined time duration $T_2$ set by the second internal timer of the local control unit 154 is the period of time for which the image transfer drum 30 turns further through a predetermined angle $\theta_b$ after the drum 30 has turned through the angle $\theta_a$ about the center axis thereof, as also shown in FIG. 2. This predetermined angle $\theta_b$ of turn of the image transfer drum 30 is such that the imaginary line on the drum 30 is turned from the location $P_1$ closest to the toner applicator sleeve 112 of the first developing unit 34a to the location $P_2$ closest to the toner applicator sleeve 112' of the second developing unit 34b.

Accordingly, the first and second predetermined time durations $T_1$ and $T_2$ set by the first and second internal timers, respectively, of the local control unit 154 are given as:

$$T_1 = L_1/V, \text{ and } T_2 = L_2/V,$$

where $L_1$ represents the circumferential measurement of the image transfer drum 30 subtended by the central angle $\theta_a$ and $L_2$ represents the circumferential measurement of the drum 30 subtended by the central angle $\theta_a + \theta_b$. Thus, a line of latent images produced on the peripheral surface of the image transfer drum 30 at a given point of time reaches the location $P_1$ closest to the toner applicator sleeve 112 of the first developing unit 34a upon lapse of the time duration $T_1$ subsequently to the given point of time. The particular line of latent images thereafter arrives at the location P$_2$ closest to the toner applicator sleeve 112' of the second developing unit 34a upon lapse of the time duration T$_2$ subsequently to the point of time when the particular line of latent images was produced on the peripheral surface of the image transfer drum 30.

Each time a line of latent images produced on the peripheral surface of the image transfer drum 30 by a single sweep of laser beam reaches the location P$_1$ closest to the toner applicator sleeve 112 of the first developing unit 34a, the count value of the first internal timer becomes zero. Likewise, the count value of the second internal timer becomes zero each time a line of latent images produced on the peripheral surface of the image transfer drum 30 by a single sweep of laser beam reaches the location P$_2$ closest to the toner applicator sleeve 112' of the second developing unit 34b.

Figure 14A:
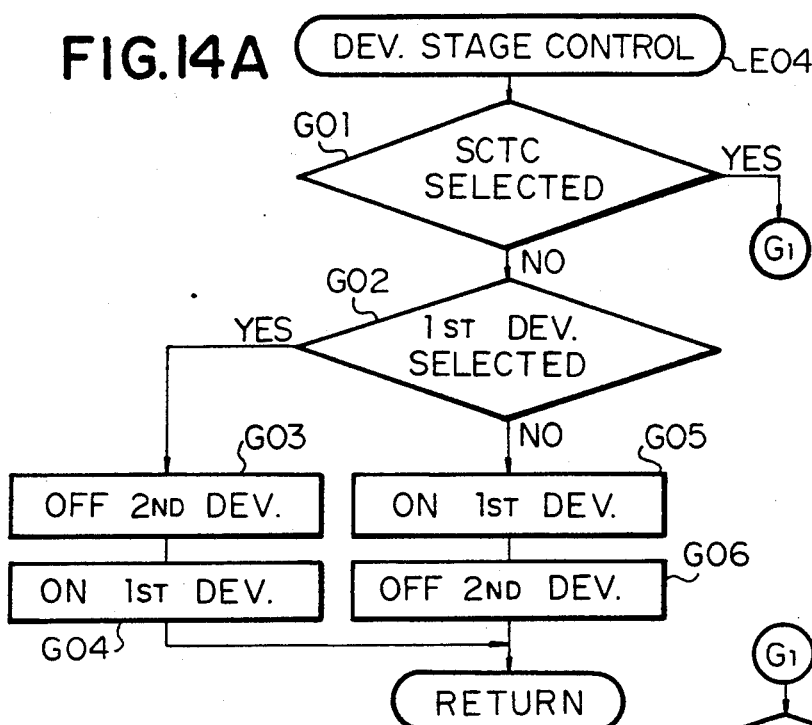
FIGS. 14A, 14B and 14C are flowcharts showing the image develop stage details of the subroutine program included in the routine program illustrated in FIG. 12.
Figure 14B:
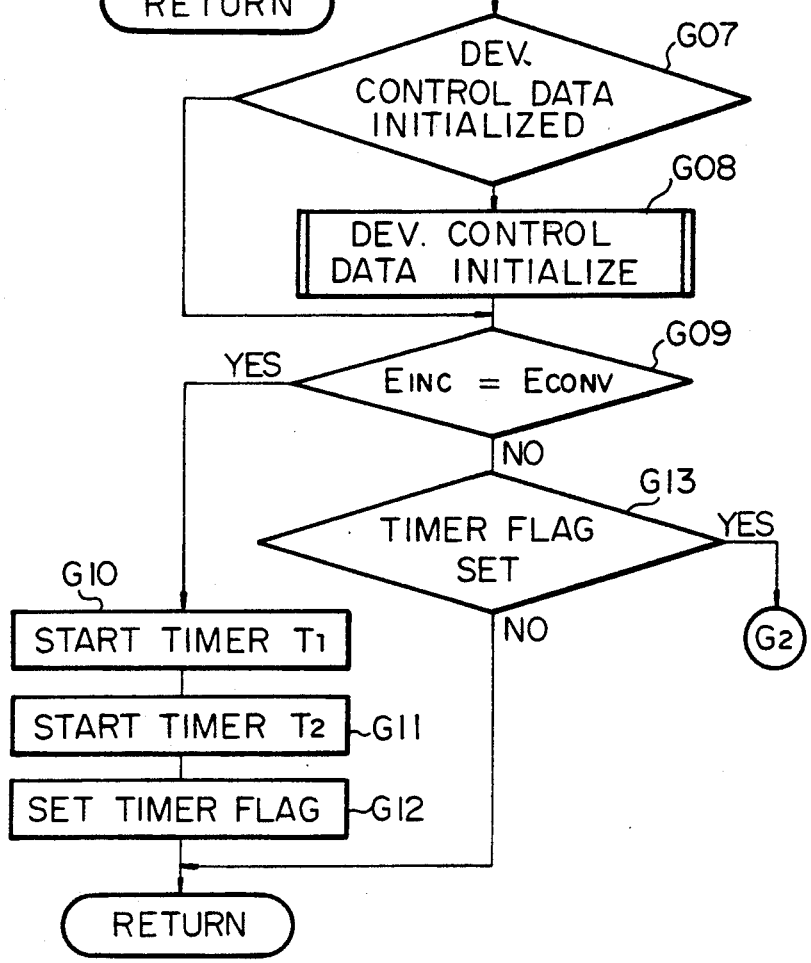
Figure 14C:
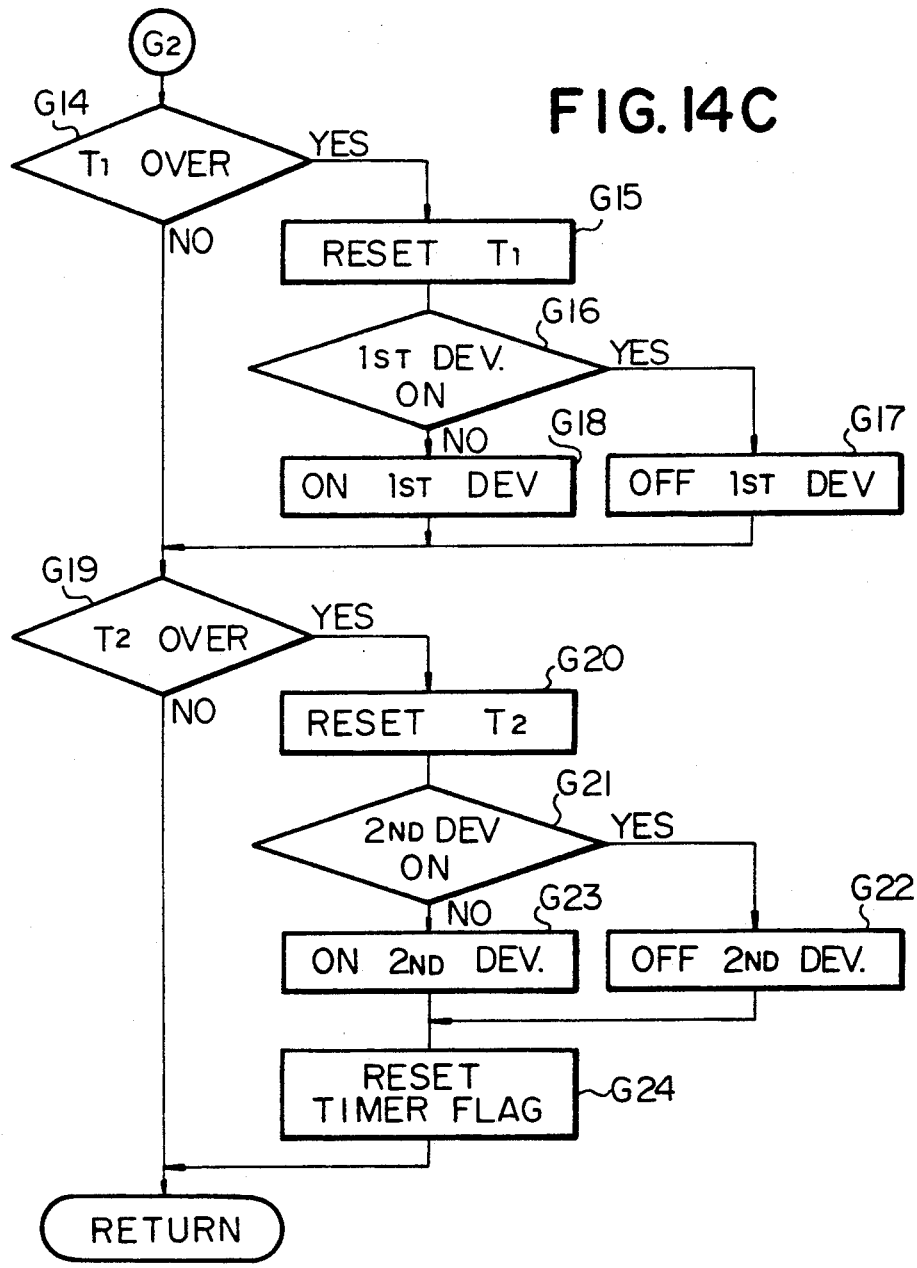

FIGS. 14A, 14B and 14C are flowcharts showing the details of the image develop stage control subroutine program E04 included in the routine program D05 described with reference to FIG. 12.

The image develop stage control subroutine program E04 starts with a decision step G01 to check whether or not there is present a signal requesting selection of the single-cycle two-color (SCTC) mode of printing operation as the mode of operation to be carried out by the printer apparatus. As previously described with reference to FIG. 9, this signal is produced at step B07 of the subroutine program A03 when it is found at step B05 that the control data D$_c$ received from the host control unit 150 contains an instruction for selecting the single-cycle two-color mode of printing operation.

If it is determined at the step G01 that there currently is no such a signal produced through execution of the subroutine program A03, the local control unit 154 determines that the normal mode of printing operation is to be selected and accordingly proceeds to another decision step G02 to detect whether or not the first developing unit 34a is selected by an instruction contained in the control data D$_c$ received from the host control unit 150. If the answer for the step G02 is given in the affirmative, the local control unit 154 proceeds to steps G03 and G04 to output command signals enabling the microprocessor unit 160 to produce control signals S$_{d1}$ and S$_{d2}$ effective to maintain de-energized the solenoid-operated actuator unit 132b for the second developing unit 34b and activate the solenoid-operated actuator unit 132a for the first developing unit 34a. If the answer for the step G02 is given in the negative, then the local control unit 154 proceeds to steps G05 and G06 to output command signals enabling the microprocessor unit 160 to produce control signals S$_{d1}$ and S$_{d2}$ effective to maintain de-energized the actuator unit 132a for the first developing unit 34a and activate the actuator unit 132b for the second developing unit 34b. Subsequently to the step G04 or step G06, the local control unit 154 reverts to the subroutine program D06 of the printer control routine program A05 described with reference to FIG. 11.

When it is determined at the step G01 that there is present a signal requesting selection of the single-cycle two-color mode of printing operation as the mode of operation to be carried out by the printer apparatus, then the local control unit 154 proceeds to step G07 (FIG. 14B) to confirm whether or not the control data predominant over operation of the image develop stage 34 for the single-cycle two-color mode of printing operation has been initialized. If the answer for this step G07 is given in the negative, the local control unit 154 proceeds to subroutine program G08 to initialize such data remaining in the local control unit 154 and microprocessor unit 160. The details of this data initializing subroutine program G07 are shown in FIG. 15.

In the data initializing subroutine program G07 shown in FIG. 15, the control data for the developing unit 34a or 34b to be put to use at an incipient stage of the single-cycle two-color mode of printing operation to be performed is first initialized at step H01. When the initialization of such data, the local control unit 154 confirms which of the previously mentioned three different criteria has been selected in the subroutine program B07 described with reference to FIG. 10. For this purpose, the local control unit 154 proceeds to step H02 to determine whether or not the control data defining the boundary between the print areas in which images are to be printed in different colors is formulated in terms of the number N$_L$ of print lines. If the answer for this step H02 is given in the affirmative, the local control unit 154 proceeds to step H03 to convert the given number N$_L$ of print lines into corresponding count values E$_{CONV}$ of the developing unit. Such conversion of the number N$_L$ is effected in accordance with the equation:

$$E_{CONV} = (D_L * N_L)/(V * T_S) \qquad \text{Eq. 1}$$

where D$_L$ represents the width of a line of images in millimeter, V represents the peripheral speed of turn of the image transfer drum 30 in millimeter per second, and T$_S$ represents the time duration allocated to each iteration of the loop of the steps D02 to D06 of the printer control subroutine program A05 described with reference to FIG. 11.

If the answer for the step H02 is given in the negative, then the local control unit 154 proceeds to step H04 to check whether or not the control data defining the boundary between the print areas is formulated in terms of the number N$_R$ of raster scanning lines. If the answer for this step H04 is given in the affirmative, the local control unit 154 proceeds to step H05 to convert the number N$_R$ of raster scanning lines into corresponding count values E$_{CONV}$ of the developing unit. This conversion of the number N$_R$ is effected in accordance with the equation:

$$E_{CONV} = (D_R * N_R)/(V * T_S) \qquad \text{Eq. 2}$$

where D$_R$ represents the width of a raster scanning line in millimeter.

If the answer for the step H04 is given in the negative, viz., when it is determined that the boundary between the print areas is defined neither in terms of the number N$_L$ of print line nor in terms of the number N$_R$ of raster scanning lines, the local control unit 154 proceeds to step H05 to convert the distance N$_D$ from the leading end of a print sheet or a page of image information into corresponding count values E$_{CONV}$ of the developing unit. This conversion of the distance N$_D$ is effected in accordance with the equation:

$$E_{CONV} = N_D/(V * T_S) \qquad \text{Eq. 3}$$

Subsequently to any of the steps H03, H05 and H06, the local control unit 154 proceeds to step H07 to store the count value E$_{CONV}$ thus converted from the data defining the boundary between the print areas in terms of any of the criteria.

Upon completion of the initialization of the develop stage control data or when the answer for the step G07 is given in the affirmative at step G07 of the develop stage control subroutine program E04 shown in 14A to 14C, the local control unit 154 proceeds to step G09 of the subroutine program E04 at which the count value $E_{CONV}$ thus converted from the data defining the boundary between the print areas in terms of any of the criteria through execution of the subroutine program G08 is compared with the count value $E_{INC}$ of the developing unit. The count value $E_{INC}$ of the developing unit is incremented at step F05 of the laser generator control subroutine program E02 described with reference to FIG. 13 each time the loop of the steps D02 to D06 of the routine program A05 including the subroutine program E02 of FIG. 13 is repeated after the laser generator unit 22 is activated at step F03 of the laser generator control subroutine program E02.

At step G09 of the subroutine program E04 is thus determined whether or not the actual count value $V_{INC}$ of the developing unit is equal to the count value $V_{CONV}$ converted from the control data. If the answer for this step G09 is given in the affirmative, the local control unit 154 proceeds to steps G10 and G11 to activate the first and second internal timers of the local control unit 154 to start the counting of time for the time durations $T_1$ and $T_2$, respectively, and further to step G12 to set a timer flag to, for example, a logic "1" state. The timer flag thus set to logic "1" state indicates that the first and second internal timers are in operation for counting time for the time durations $T_1$ and $T_2$, respectively. The local control unit 154 then terminates execution of the subroutine program E04 and returns to the subroutine program D06 of the printer control routine program A05 described with reference to FIG. 11.

When it is found at step G09 that the actual count value $V_{INC}$ of the developing unit is not yet equal to the count value $V_{CONV}$ converted from the control data, it is further queried at step G13 whether or not the timer flag is set to logic "1" state. If it is found that the timer flag is reset to logic "0" state, the local control unit 154 also terminates execution of the subroutine program E04 and returns to the subroutine program D06 of the printer control routine program A05.

As has been described, the developing unit incorporated in the local control unit 154 has its count value $E_{INC}$ incremented each time the loop of the steps D02 to D06 of the routine program A05 including the subroutine program E02 of FIG. 13 is repeated after the laser generator unit 22 has been activated at step F03 of the subroutine program E02 described with reference to FIG. 13. The first and second internal timers of the local control unit 154 are activated to start counting of time when such a count value $E_{INC}$ is equalized with the count value $E_{CONV}$ converted from the control data originating in the host control unit 150.

In the meantime, if it is found at step G13 that the timer flag is set to logic "1" state, then the local control unit 154 proceeds to step G14 (FIG. 14C) to check if the first internal timer of the local control unit 154 has completed the counting of time for the time duration $T_1$. If it is found at this step G14 that the time duration $T_1$ has lapsed for the first internal timer, the local control unit 154 proceeds to step G15 to reset the first internal timer to logic "0" state and thereupon detects at step G16 whether or not the first developing unit 34a is currently in operation. If it is found at this step G16 that the first developing unit 34a is currently in operation, the local control unit 154 proceeds to step G17 to output a command signal enabling the microprocessor unit 160 to produce a control signal $S_{d1}$ effective to de-energize the solenoid-operated actuator unit 132a for the first developing unit 34a. If the answer for the step G16 is given in the negative, then the local control unit 154 proceeds to step G18 to output a command signal enabling the microprocessor unit 160 to produce a control signal $S_{d1}$ effective to activate the actuator unit 132a for the first developing unit 34a.

Subsequently to the step G17 or step G18 or when it is found at step G14 that the first internal timer is still in the process of counting time, the local control unit 154 proceeds to step G19 to check if the second internal timer of the local control unit 154 has completed the counting of time for the time duration $T_2$. If it is found at this step G19 that the time duration $T_2$ has lapsed for the second internal timer, the local control unit 154 proceeds to step G20 to reset the second internal timer to logic "0" state and thereupon detects at step G21 whether or not the second developing unit 34b is currently in operation. If it is found at this step G21 that the second developing unit 34b is currently in operation, the local control unit 154 proceeds to step G22 to output a command signal enabling the microprocessor unit 160 to produce a control signal $S_{d2}$ effective to de-energize the solenoid-operated actuator unit 132b for the second developing unit 34b. If the answer for the step G21 is given in the negative, then the local control unit 154 proceeds to step G23 to output a command signal enabling the microprocessor unit 160 to produce a control signal $S_{d2}$ effective to activate the actuator unit 132b for the second developing unit 34b. The local control unit 154 then resets the timer flag to logic "0" state as at step G24.

Subsequently to step G24 or when it is found at step G19 that the second internal timer is still in the process of counting time, the local control unit 154 terminates execution of the subroutine program E04 and returns to the subroutine program D06 of the printer control routine program A05 described with reference to FIG. 11.

While a sole preferred embodiment of an image recording system according to the present invention has been hereinbefore described, it should be borne in mind that the embodiment described is simply for the purpose of illustration of the gist of the present invention and is accordingly subject to change and modification in numerous manners if desired. While, for example, it has been assumed that the image develop stage 34 of the printer apparatus to form part of the image recording system embodying the present invention has two developing units, it will be apparent that three or more developing units may be provided at the image develop stage of a printer apparatus of an image recording system according to the present invention.

Furthermore, it has been described that the control data defining the boundary between the specified areas of a print sheet in which images are to be printed in the single-cycle two-color mode of printing operation is converted into a corresponding count value of the developing unit depending on the type of the data which may be formulated in terms of any of the three different criteria consisting of the distance $N_D$, the number $N_R$ of raster scanning lines and the number $N_L$ of print lines. Such conversion of the control data defining the single-cycle two-color print areas may be dispensed with where the hardware arrangement including the print line discriminator 162, line counter 168 and raster scanning line counter 172 provided in the control system described with reference to FIG. 6 is used so that the data produced by the hardware arrangement is processed by the microprocessor unit 160 to produce digital data representative of the number $N_L$ of print lines, the number $N_R$ of raster scanning lines and the distance of a row of images from, for example, the leading end of a print sheet.

What is claimed is:

1. An image recording system comprising a host control unit for supplying image data representative of the images to be printed on a recorded medium and a printer apparatus for forming printed images on the record medium on the basis of the data received from the host control unit, wherein
    (A) said host control unit is operative to further supply control data predominant over the modes and conditions in which the images are to be printed on the record medium, said control data containing color data specifying at least one of a plurality of colors in which printed images are to be formed on the record medium, and
    (B) said printer apparatus comprises
        (a) means having a photoconductive surface,
        (b) latent image forming means responsive to said image data for forming a page of electrostatic latent images on said photoconductive surface,
        (c) a plurality of visual image forming means for developing said page of electrostatic latent images on said photoconductive surface,
        (d) image transfer means for transferring the resultant images to said record medium, and
        (e) change-over means which, when one of said visual image forming means is an operation developing a page of electrostatic latent images on said photoconductive surface, activates another visual image forming means and deactivates the former.

2. An image recording system as set forth in claim 1, in which said host control unit and said printer apparatus are operatively coupled together through signal transmission lines to exchange data by way of the signal transmission lines.

3. An image recording system comprising a printer apparatus, external data processing means and internal data processing means operatively coupled to the external data processing means by hardware means through which data is to be exchanged between said internal data processing means and said external data processing means,
    (a) said printer apparatus having a first mode of operation in which visible images are to be formed in a single color on a single record medium and a second mode of operation in which visible images are to be formed in at least two different colors on a single record medium during a single cycle of operation,
    (b) said external data processing means being operative to supply to said internal data processing means data containing image data representative of visible images to be formed on a record medium and control data containing
        first control data for selecting one of said first and second modes of operation,
        second control data defining at least two contiguous areas within which visible images are to be formed on a record medium in said second mode of operation, and
        third control data indicating the color in which visible images are to be formed on a record sheet in said first mode of operation or the colors in which visible images are to be formed on a record sheet in said second mode of operation,
    (c) said printer apparatus comprising
        latent image carrying means having a photoconductive surface on which a page of electrostatic latent images are arranged in rows,
        latent image forming means responsive to said image data through said internal data processing means for producing rows of electrostatic latent images on said photoconductive surface, the rows of latent images being formed successively in a predetermined direction with respect to said surface, and
        a plurality of converting means each operative to convert said latent images into visible images on a record medium when activated, each of said converting means being responsive to said third control data through said internal data processing means for converting said latent images into visible images in the color specified by said third control data,
    (d) said internal data processing means comprising
        first data generating means responsive to said first control data through said internal data processing means for generating variable data defining a location of a row of images within said page of electrostatic latent images, said variable data being variable as the rows of latent images are formed successively in said predetermined direction on said surface,
        second data generating means responsive to said second control data through said internal data processing means for generating reference data defining the boundary between said contiguous areas defined by the second control data,
        detecting means responsive to said reference data and said variable data for detecting whether or not the latter conforms to the former and generating a signal when it is determined that said variable data conforms to said reference data,
        activating means responsive to said first control data and said third control data through said internal data processing means for activating one of said converting means in response to said first control data, said activating means being further responsive to said signal from said detecting means for activating another converting means and de-activating the converting means which has been activated in response to said first control data.

4. An image recording system as set forth in claim 3 in which said second control data on the basis of which said reference data is generated by said second data generating means is formulated in terms of any of the criteria including:
    (1) the distance of the boundary between said contiguous areas from a predetermined reference position of said page of latent images produced on said photoconductive surface,
    (2) the number of print lines each consisting of a predetermined number of rows of image anterior to the boundary between said contiguous areas, and (3) the number of scanning lines which said latent image forming means produces by scanning said photoconductive surface for successively forming said rows of images until the boundary between said contiguous areas is reached, said internal data processing means further comprising means for converting said reference data into a value indicative of a corresponding location of a row of images within said page of electrostatic latent images.

5. An image printing apparatus for forming printed images on a recording medium with desired colors on the basis of an image data representative of the images to be printed and a color data designating the desired color received from a data supplying unit, said image printing apparatus comprising:

means having a photoconductive surfaces, latent image forming means responsive to said image data for forming a page of electrostatic latent images on said photoconductive surface, a plurality of visual image forming means for developing said page of electrostatic latent images on said photoconductive surface with different colors, image transfer means for transferring the resultant images to said record medium, and change-over means responsive to said color data, when one of said visual image forming means is in operation developing a page of electrostatic latent images of said photoconductive surface, for activating another visual image forming means into operation and de-activating the former.

6. An image printing apparatus as claimed in claim 5 wherein said printer apparatus and said data supplying unit are operatively coupled together through signal transmission line, and said data supplying unit supplies said image data and the color data to said printer apparatus through said signal transmission line.

7. In an image recording system comprising a data supply means for supplying image data representative of the images to be printed on a record medium and color data representative of the colors with which the images are to be printed on a recording medium and an image forming means which includes a photosensitive member, electrostatic latent image forming means, a plurality of developing means and transfer means for forming printed image on the recording medium on the basis of the data received from the data supply means, the method of operating the image recording system comprising the steps of:

supplying said image data and said color data from said data supply means to said image forming means;

forming a page of electrostatic latent images on said photoconductive member in response to said image data;

activating one of developing means for developing said page of electrostatic latent images on said photoconductive surface with one color in response to the color data;

activating another developing means into operation and de-activating the former, when one of said developing means is in operation developing the page of electrostatic latent images of said photoconductive surface, for developing the remaining part of said page of electrostatic latent images on said photoconductive surface with another color; and transferring the resultant images to said record medium.

8. The method as claimed in claim 7, wherein said color data includes timing data for determining activating said another developing means and de-activating said former developing means.

9. In an image printing apparatus for forming printed images on a recording medium with desired colors on the basis of an image data representative of the images to be printed and a color data designating the desired colors received from a data supplying unit, the method of operating said image printing apparatus comprising the steps of:

forming a page of electrostatic latent images on a photoconductive member in response to said image data;

activating a visual image forming means for developing said page of electrostatic latent images on said photoconductive surface with one color in response to the color data;

activating another visual image forming means into operation and de-activating the former, when one of said visual image forming means is in operation developing the page of electrostatic latent images of said photoconductive surface, for developing the remaining part of said page of electrostatic latent images on said photoconductive surface with another color; and transferring the resultant images to said record medium.

10. An image recording system comprising a printer apparatus, external data processing means and internal data processing means operatively coupled to the external data processing means by hardware means through which data is to be exchanged between said internal data processing means and said external data processing means, (a) said printer apparatus having a first mode of operation in which visible images are to be formed in a single color on a single record medium and a second mode of operation in which visible images are to be formed in at least two different colors on a single record medium, (b) said external data processing means being operative to supply to said internal data processing means data containing image data representative of visible images to be formed on a record medium and control data containing first control data for selecting one of said first and second modes of operation, second control data defining at least two independent areas within which visible images are to be formed on a record medium in said second mode of operation, and third control data indicating the color in which visible images are to be formed on a record sheet in said first mode of operation or the colors in which visible images are to be formed on a record sheet in said second mode of operation, (c) said printer apparatus comprising latent image carrying means having a photoconductive surface on which a page of electrostatic latent images are arranged in rows, latent image forming means responsive to said image data through said internal data processing means for producing rows of electrostatic latent images on said photoconductive surface, the rows of latent images being formed successively in a predetermined direction with respect to said surface, and a plurality of converting means each operative to convert said latent images into visible images on a record medium when activated, each of said converting means being responsive to said third control data through said internal data processing means for converting said latent images into visible images in the color specified by said third control data, and activating means responsive to said first control data and said third control data through said internal data processing means for activating one of said converting means.

11. An image forming apparatus connected to an external data supply device by means of a data line, said image forming apparatus comprising:

receiving means for receiving an image data and a color data from said external data supply device via said data line;

a photosensitive member;

laser emitting means for emitting a laser beam onto said photosensitive member;

first control means, responsive to said image data received by said receiving means, for controlling said laser emitting means so as to form a latent image on said photosensitive member corresponding to said image data;

a plurality of developing means each including a different color of toner for visualizing the latent image formed on said photosensitive member; and second control means, responsive to said color data received by said receiving means, for selecting one of said developing means so as to form the visual image with the color corresponding to said color data.

12. An image forming apparatus connected to an external data supply device by means of a data line, said image forming apparatus comprising:

a photosensitive member;

laser emitting means for emitting a laser beam onto said photosensitive member;

a plurality of developing means each including a different color of toner for visualizing the latent image formed on said photosensitive member; and receiving means for receiving an image data and a color data from said external data supply device via said data line; and control means for controlling said image forming apparatus based on said image data and said color data supplied by said data supply device through said data line, said control means including first control means, responsive to said image data received by said receiving means, for controlling said laser emitting means so as to form a latent image on said photosensitive member corresponding to said image data and second control means, responsive to said color data received by said receiving means, for selecting one of said developing means so as to form the visual image with the color corresponding to said color data.

* * * * *